(12) United States Patent
Karmoose et al.

(10) Patent No.: US 12,520,305 B2
(45) Date of Patent: Jan. 6, 2026

(54) SYSTEMS AND METHODS FOR DYNAMIC UPLINK TRANSMITTER SWITCHING

(71) Applicant: Samsung Electronics Co., Ltd., Suwon-si (KR)

(72) Inventors: Mohammed Karmoose, San Diego, CA (US); Jung Hyun Bae, San Diego, CA (US)

(73) Assignee: Samsung Electronics Co., Ltd., Yongin-si (KR)

(*) Notice: Subject to any disclaimer, the term of this patent is extended or adjusted under 35 U.S.C. 154(b) by 419 days.

(21) Appl. No.: 18/080,622

(22) Filed: Dec. 13, 2022

(65) Prior Publication Data

US 2023/0232395 A1    Jul. 20, 2023

Related U.S. Application Data

(60) Provisional application No. 63/403,211, filed on Sep. 1, 2022, provisional application No. 63/394,162, filed on Aug. 1, 2022, provisional application No. 63/299,839, filed on Jan. 14, 2022.

(51) Int. Cl.
*H04W 72/1268* (2023.01)
*H04W 76/20* (2018.01)

(52) U.S. Cl.
CPC ....... *H04W 72/1268* (2013.01); *H04W 76/20* (2018.02)

(58) Field of Classification Search
CPC ............. H04W 72/1268; H04W 72/02; H04W 76/20; H04W 76/28; H04W 76/15; H04W 72/0453; H04B 7/0404; H04B 7/0413; H04L 5/001; H04L 5/0096
See application file for complete search history.

(56) References Cited

U.S. PATENT DOCUMENTS

| | | |
|---|---|---|
| 2013/0195073 A1 | 8/2013 | Chen et al. |
| 2016/0143035 A1 | 5/2016 | Xue et al. |
| 2017/0127327 A1 | 5/2017 | Newbury et al. |
| 2018/0054824 A1 | 2/2018 | Xue et al. |
| 2019/0208525 A1 | 7/2019 | Xue et al. |
| 2024/0147440 A1* | 5/2024 | Gaal ....................... H04L 5/001 |
| 2024/0250799 A1* | 7/2024 | Rastegardoost ...... H04L 5/0096 |
| 2024/0357681 A1* | 10/2024 | Rastegardoost ........ H04W 8/22 |

* cited by examiner

*Primary Examiner* — Robert C Scheibel
(74) *Attorney, Agent, or Firm* — Womble Bond Dickinson (US) LLP

(57) ABSTRACT

A system and a for dynamic uplink transmitter switching may include configuring, by a user equipment (UE), a first uplink (UL) transmission on one or more carriers out of at least three carriers; configuring, by the UE, a second UL transmission on the one or more carriers out of the at least three carriers; and scheduling, by the UE, an interruption time on one or more of the at least three carriers according to a predetermined criteria based on a state of transmit (Tx) chains for the first UL transmission and a state of Tx chains for the second UL transmission.

26 Claims, 6 Drawing Sheets

SYSTEMS AND METHODS FOR DYNAMIC UPLINK TRANSMITTER SWITCHING

CROSS-REFERENCE TO RELATED APPLICATIONS

This application claims the priority benefit under 35 U.S.C. § 119(e) of U.S. Provisional Application No. 63/403,211, filed on Sep. 1, 2022; U.S. Provisional Application No. 63/394,162, filed on Aug. 1, 2022; and U.S. Provisional Application No. 63/299,839, filed on Jan. 14, 2022, the disclosures of which are incorporated by reference in their entirety as if fully set forth herein.

TECHNICAL FIELD

The disclosure generally relates to uplink transmissions. More particularly, the subject matter disclosed herein relates to improvements to systems and methods for dynamic uplink transmitter switching.

SUMMARY

In 5G-NR applications, user equipment (UE) can send transmission to the gNodeB (gNb) server via uplink (UL) transmissions. Similarly, the gNb can send transmission from the gNb to the UE via downlink transmissions. Embodiments of the present disclosure are directed to techniques for performing uplink transmission from the UE to the gNb.

In some embodiments, carrier aggregation is utilized during such uplink transmissions where multiple bands of carriers are utilized. Consequently, an uplink transmission may be performed on one carrier and another uplink transmission may be done on another carrier. In some embodiments, these multiple transmissions may be performed concurrently (e.g., simultaneously), which is referred to as dual uplink transmissions, or one after another, which is referred to as switched uplink transmissions.

As the uplink transmissions switch from one carrier to another, the UE needs time to prepare the associated systems. Thus, a switch time or an interruption time is needed where no uplink transmissions take place. Accordingly, techniques for determining whether such interruption time is needed is desired.

According to an embodiment of the present disclosure, a method may include configuring, by a user equipment (UE), a first uplink (UL) transmission on one or more carriers out of at least three carriers; configuring, by the UE, a second UL transmission on the one or more carriers out of the at least three carriers; and scheduling, by the UE, an interruption time on one or more of the at least three carriers according to a predetermined criteria based on a state of transmit (Tx) chains for the first UL transmission and a state of Tx chains for the second UL transmission.

The state of the Tx chains for the first UL transmission may include one Tx chain associated with a first carrier and one Tx chain associated with a second carrier, the method further including scheduling the interruption time responsive to determining that the second UL transmission includes a 1 port transmission or a 2 port transmission on the third carrier.

The state of the Tx chains for the first UL transmission may include two Tx chains associated with a first carrier, the method further including scheduling the interruption time responsive to determining that the second UL transmission includes a 1 port transmission on the second carrier and a 1 port transmission on the third carrier.

The state of the Tx chains for the first UL transmission may include one Tx chain associated with a first carrier and one Tx chain associated with a second carrier, the method further including scheduling the interruption time responsive to determining that the second UL transmission includes a 1 port transmission on the first carrier and a 1 port transmission on the third carrier.

The state of the Tx chains for the first UL transmission may include two Tx chains associated with a first carrier, and the second UL transmission includes a 1 port transmission on the second carrier, the method further including switching two Tx chains or one Tx chain to the second carrier in the second UL transmission and not transmitting on the first carrier and the third carrier, based on radio resource control (RRC) indication.

The method may further include configuring, by the UE, a third UL transmission on the one or more carriers out of the at least three carriers, wherein the third UL transmission on the first carrier or the third carrier does not overlap with a duration of the second transmission on the second carrier.

The third UL transmission on the first carrier or the third carrier may start after a duration of length N_(Tx1-Tx2) from an end of the second UL transmission on the second carrier and/or ends before a duration of length N_(Tx1-Tx2) from a start of the second UL transmission on the second carrier.

The method may further include configuring, by the UE, a third UL transmission on the one or more carriers out of the at least three carriers, wherein the third UL transmission on the first carrier or the third carrier starts later than a starting time of the second transmission on the second carrier.

The state of the Tx chains for the first UL transmission may include one Tx chain associated with a first carrier and one Tx chain associated with a second carrier, and the second UL transmission includes a 1 port transmission on the third carrier, the method further including switching two Tx chains or one Tx chain to the third carrier in the second UL transmission and not transmitting on the first carrier and the second carrier, based on RRC indication.

The method may further include switching one Tx chain to the third carrier in the second UL transmission, and switching another Tx chain to any one or more of remaining carriers, based on RRC indication.

A first carrier, a second carrier, and a third carrier of the at least three carriers may each be configured to support two ports.

A first carrier of the at least three carriers may be configured to support one port, and second and third carriers of the at least three carriers may be configured to support two ports.

First and second carriers of the at least three carriers may be configured to support one port, and a third carrier of the at least three carriers is configured to support two ports.

According to another embodiment, a system is described. The system may include a user equipment (UE) that includes: a memory; and a processor configured to execute instructions stored in the memory to perform operations including: configuring a first uplink (UL) transmission on one or more carriers out of at least three carriers; configuring a second UL transmission on the one or more carriers out of the at least three carriers; and scheduling an interruption time on one or more of the at least three carriers according to a predetermined criteria based on a state of transmit (Tx)

chains for the first UL transmission and a state of Tx chains for the second UL transmission.

The state of the Tx chains for the first UL transmission includes one Tx chain associated with a first carrier and one Tx chain associated with a second carrier, the operation further including scheduling the interruption time responsive to determining that the second UL transmission includes a 1 port transmission or a 2 port transmission on the third carrier.

The state of the Tx chains for the first UL transmission may include two Tx chains associated with a first carrier, the operations further including scheduling the interruption time responsive to determining that the second UL transmission includes a 1 port transmission on the second carrier and a 1 port transmission on the third carrier.

The state of the Tx chains for the first UL transmission may include one Tx chain associated with a first carrier and one Tx chains associated with a second carrier, the operations further including scheduling the interruption time responsive to determining that the second UL transmission includes a 1 port transmission on the first carrier and a 1 port transmission on the third carrier.

The state of the Tx chains for the first UL transmission may include two Tx chains associated with a first carrier, and the second UL transmission includes a 1 port transmission on the second carrier, the operations further including switching two Tx chains or one Tx chain to the second carrier in the second UL transmission and not transmitting on the first carrier and the third carrier, based on radio resource control (RRC) indication.

The operations may further include configuring, by the UE, a third UL transmission on the one or more carriers out of the at least three carriers, wherein the third UL transmission on the first carrier or the third carrier does not overlap with a duration of the second transmission on the second carrier.

The third UL transmission on the first carrier or the third carrier may start after a duration of length N_(Tx1-Tx2) from an end of the second UL transmission on the second carrier and/or ends before a duration of length N_(Tx1-Tx2) from a start of the second UL transmission on the second carrier.

The operations may further include configuring, by the UE, a third UL transmission on the one or more carriers out of the at least three carriers, wherein the third UL transmission on the first carrier or the third carrier starts later than a starting time of the second transmission on the second carrier.

The state of the Tx chains for the first UL transmission may include one Tx chain associated with a first carrier and one Tx chain associated with a second carrier, and the second UL transmission includes a 1 port transmission on the third carrier, the operations further including switching two Tx chains or one Tx chain to the third carrier in the second UL transmission and not transmitting on the first carrier and the second carrier, based on RRC indication.

The operations may further including switching one Tx chain to the third carrier in the second UL transmission, and switching another Tx chain to any one or more of remaining carriers, based on RRC indication.

A first carrier, a second carrier, and a third carrier of the at least three carriers may each be configured to support two ports.

A first carrier of the at least three carriers may be configured to support one port, and second and third carriers of the at least three carriers may be configured to support two ports.

First and second carriers of the at least three carriers may be configured to support one port, and a third carrier of the at least three carriers is configured to support two ports.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
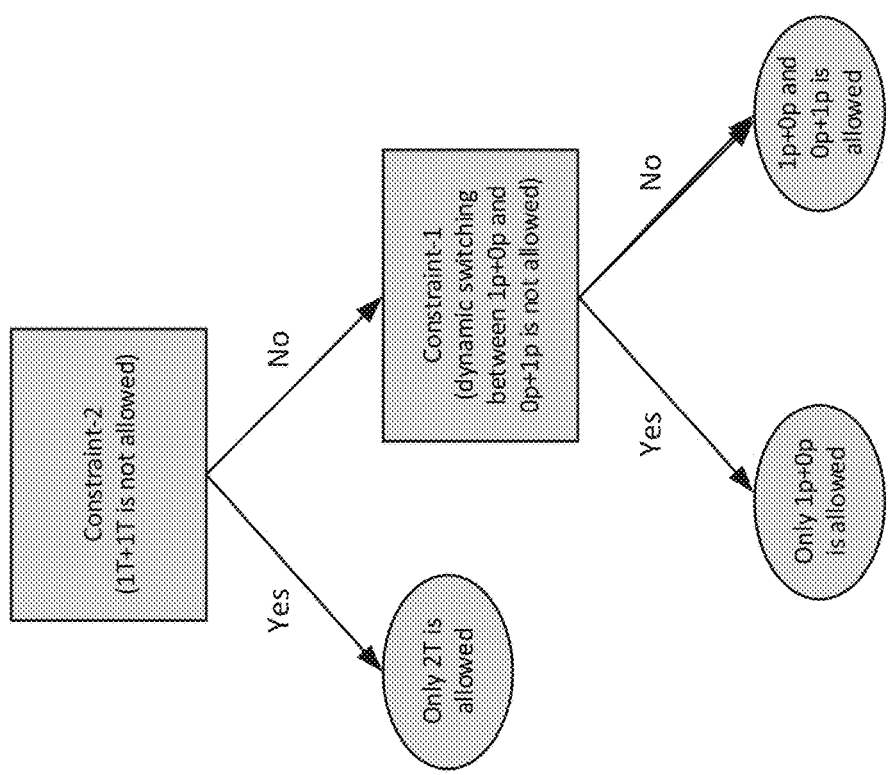
FIG. 1 is flow diagram illustrating a relation between two constraints, according to embodiments of the present disclosure.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Multiple-input, multiple-output (MIMO) transmissions from user equipment (UE) may have various advantages over a single transmit (Tx) antenna. There may also be various advantages with schemes with multiple carriers such as carrier aggregation (CA), dual connectivity (DC) (including multi-radio (MR) DC such as E-UTRA/NR (EN) DC), and supplementary uplink (SUL), which are described in 3rd Generation Partnership Project (3GPP) specifications. In some instances, commercial UEs may support these multi-carrier schemes. Some commercial UEs may only support up to two concurrent uplink (UL) Tx chains. In this case, if a UE supports two UL carriers, then one UL Tx chain may be dedicated for each carrier according an implementation, and this UE may not be able to utilize benefits of UL 2 Tx MIMO. Hence, there is a need for techniques that allow a UE to switch a Tx chain from one carrier to another carrier such that UL MIMO can operate in one of those carriers.

3GPP has specified mechanisms which allow a UE to configure the state of the Tx chains between 2 UL carriers in different cases, namely:

1Tx-2Tx: in this case, the UE can switch the Tx chains between 1T+1T to 0T+2T

2Tx-2Tx: in this case, the UE is also allowed to switch the Tx chains between 2T+0T and 0T+2T Herein the present disclosure, the expression xT+yT corresponds to the Tx configuration where x of the Tx chains is configured on Carrier 1, and y of the Tx chains is configured on Carrier 2. 3GPP also considered the following variations of the considered switching cases:

SUL and CA with Option 1: In this case, the UE may transmit on one carrier at a time. In other words, concurrent (e.g., simultaneous) transmissions on two carriers are not possible. This case may be applicable when Carrier 1 is the SUL carrier, or when the CA is configured with Option 1.

CA with Option 2: In this case, the UE may transmit on two carriers concurrently (e.g., simultaneously). This case may be applicable when the CA is configured with Option 2.

When considering transmissions on the two carriers, a transmission on one carrier can be 1P or 2P transmission, where xP denotes a transmission that includes x ports. Some specifications considered the above two cases of Tx chains configurations where two UL carriers are configured. Yet in other embodiments of the present disclosure, three or more UL carriers may be configured with total of 2Tx chains at a UE side.

In the disclosure as follows, when a transmission of the form "1p on carrier X" is provided, it refers to a transmission of 1p on carrier X and no other transmission on other carriers.

Herein the present disclosure, the terms "switching time" refers to a time duration on a carrier where no UL transmission can occur. The terms "switching time" may be used interchangeably with the terms "interruption time." Further explanation of the switching time will be described in more detail later in the present disclosure.

In the following description, it is assumed that when a switching occurs where a Tx is configured from one carrier to another when three or more carriers are available, that switching time may be used on the affected carriers. Existence of switching times on carriers may be determined below based on this assumption. In some embodiments, switching time may be established on all available carriers whenever a switching case exists. In this case, every switching case mentioned below may result in the necessity of switching time established on all available carriers.

In some embodiments, a UE can be configured through specifications to behave in either of the two ways. Alternatively, a UE can indicate a UE capability as to which of the two behaviors (i.e., implementing switching time on all carriers, or only the affected carriers) a UE can support. In some embodiments, a UE may indicate specific groups of carriers in which a UE applies switching time, regardless of the affected carriers.

SUL and UL CA with Option 1

In some embodiments, different approaches may be considered for dynamic UL Tx switching, which depends on the number of Tx chains that can be supported on a given carrier.

State-1: In this state, a carrier can support up to 1T. This may be referred to as 1Tx.

State-2: In this state, a carrier can support up to 2T. This may be referred to as 2Tx.

Two carriers/bands may be considered for UL Tx switching in NR. For example, in Rel-16, one carrier is assumed to be in state-1 (Carrier 1) while the other is in state-2 (Carrier 2), whereas in Rel-17 both carriers are in state-2. In addition, the following constraints may be assumed:

Constraint-1: Configuration 1T+1T is allowed, but no dynamic switching is allowed between 1P+0P and 0P+1P under 1T+1T. Only 1P+0P is allowed in 1T+1T.

Constraint-2: Configuration 1T+1T is not allowed.

FIG. 1 shows a relation between the two constraints above. For example, the Rel-16 operation was in the spirit of assuming 1 carrier to be in State-1 while following Constraint 1. On the other hand, Rel-17 operation was assumed State-2 for both carriers while following Constraint-2. According to various embodiments of the present disclosure, these approaches may be extended for the case of switching among 3 carriers.

2Tx-2Tx-2Tx

In some embodiments, a 2Tx-2Tx-2Tx case may be considered. In this case, all three carriers are in the 2Tx state.

I some embodiments, 1T+1T is not allowed (with Constraint-2). Thus, start first by adopting the Rel-17 approach where 1T+1T is not allowed between any two carriers.

TABLE 1

| | Number of Tx chains in WID (Carrier 1 + Carrier 2 + Carrier 3) | Number of antenna ports for UL transmission (Carrier 1 + Carrier 2 + Carrier 3) |
|---|---|---|
| Case 1 | 0T + 0T + 2T | 0P + 0P + 1P, 0P + 0P + 2P |
| Case 3 | 0T + 2T + 0T | 0P + 1P + 0P, 0P + 2P + 0P |
| Case 5 | 2T + 0T + 0T | 1P + 0P + 0P, 2P + 0P + 0P |

Accordingly, the switching rules may be described such that if the current Tx configuration is 2T on carrier i and either 1p or 2p transmission is scheduled on carrier j, then move to 2T on carrier j; and switching time may be required on carrier i and carrier j.

In some embodiments, 1T+1T is allowed (no Constraint-2). Thus, 1T+1T may be allowed between any pair of carriers. These configurations may only support 1p transmissions. In this case, there are two variations as follows:

Variation 1 (no Constraint-1) (Version 1)

In this case, 1p transmissions are allowed on both 1T+1T configurations. Additionally, two further alternatives may be considered.

According to Alternative-1 (Version 1), 1p transmissions are also allowed on 2T configurations.

TABLE 2

| | Number of Tx chains in WID (Carrier 1 + Carrier 2 + Carrier 3) | Number of antenna ports for UL transmission (Carrier 1 + Carrier 2 + Carrier 3) |
|---|---|---|
| Case 1 | 0T + 0T + 2T | 0P + 0P + 1P, 0P + 0P + 2P |
| Case 2 | 0T + 1T + 1T | 0P + 0P + 1P, 0P + 1P + 0P |
| Case 3 | 0T + 2T + 0T | 0P + 1P + 0P, 0P + 2P + 0P |
| Case 4 | 1T + 1T + 0T | 1P + 0P + 0P, 0P + 1P + 0P |
| Case 5 | 2T + 0T + 0T | 1P + 0P + 0P, 2P + 0P + 0P |
| Case 6 | 1T + 0T + 1T | 1P + 0P + 0P, 0P + 0P + 1P |

This configuration gives a greater (e.g., maximum) amount of flexibility in terms of allowing 1p/2p transmissions given the Tx chain configuration because it allows all possible transmission combinations allowed for the Tx configuration. However, some ambiguity may be present in mapping because multiple Tx configurations are allowed for the same transmission combination.

Some rules can be inferred in this case, for example, switching time may be implemented in the following cases: (assume $i,j,k \in \{1,2,3\}$, $i \neq j \neq k$)

If the current Tx configuration is 2T on carrier i, and
Next transmission is a 2p transmission on carrier j—in this case, switching is to 2T on carrier j, switching time may be needed on carriers i and j
Next transmission is a 1p transmission on carrier j—in this case switching can be (ambiguity 1)
To 2T on carrier j, switching time may be needed on carriers i and j
To 1T on carrier j and 1T on carrier i; switching time may be needed on carrier i and carrier j
To 1T on carrier j and 1T on carrier k; switching time may be needed on all three carriers If the current Tx configuration is 1T on carrier i and 1T on carrier j, and
Next transmission is a 2p transmission on carrier i (or carrier j)—in this case, switching is to 2T on carrier i (or carrier j); switching time may be needed on carriers i and j
Next transmission is a 2p transmission on carrier k—in this case, switching is to 2T on carrier k; switching time may be needed on all carriers
Next transmission is a 1p transmission on carrier i (or carrier j)—in this case, switching can be (ambiguity 2)
To 2T on carrier i (or carrier j); switching time may be needed on carriers i and j
To 1T on carrier i and 1T on carrier j; no switching time may be required since no Tx configuration switching occurs
To 1T on carrier i (or carrier j) and 1T on carrier k; switching time may be needed on all carriers
Next transmission is a 1p transmission on carrier k—in this case, switching can be (ambiguity 3)
To 2T on carrier k; switching time may be needed on carriers i and j
To 1T on carrier k and 1T on carrier i; switching time may be needed on carriers j and k To 1T on carrier k and 1T on carrier j; switching time may be needed on carriers i and k When ambiguities are present, they can be resolved by following various rules, which may be referred to herein as "philosophies. Accordingly, in resolving such ambiguities, different philosophies may be adopted and followed where each philosophy can lead to different behaviors for UEs. Examples of these philosophies are:

Philosophy 1: A UE tries to prepare for upcoming transmissions with the maximum number of ports, thus configuring the necessary number of Tx chains on the carrier; or a UE tries to maintain a target number of Tx chains on a carrier, where that target number can be radio resource control (RRC) configured for the carrier.

Philosophy 2: A UE tries to prepare the Tx chains to minimize the amount of interruption times across carriers.

Philosophy 3: A UE chooses to configure Tx chains across carriers according to a certain metric of importance that is associated with the configured carriers. This notion can be RRC configured, or it may be associated with the nature of the configured UL carriers (e.g., SUL is more/less importance than other UL carriers). In addition, this philosophy can be adopted in conjunction with philosophy 1 and/or philosophy 2. For example, a UE can try to increase (e.g., maximize) the number of Tx chains configured on the most important carrier, or the UE can try to reduce (e.g., minimize) the amount of interruptions on the most important carrier.

In some embodiments, different mechanisms may be considered for resolving ambiguities:

Philosophy 1: A UE can move to a 2T on the next carrier, which allows the UE to be ready for 2p transmissions. This translates to the following behavior:
(ambiguity 1): Move to 2T on carrier j
(ambiguity 2): Move to 2T on carrier i (or carrier j)
(ambiguity 3): Move to 2T on carrier k Philosophy 2-A: A UE can keep 1T on the new carrier and 1T on the previous carrier, which may be more reasonable if more 1p transmissions are expected to be scheduled. This translates to the following behavior:
(ambiguity 1): Move to 1T on carrier i and 1T on carrier j
(ambiguity 2): Move to 1T on carrier i and 1T on carrier j
(ambiguity 3):
  Move to 1T on carrier i and 1T on carrier k
  Move to 1T on carrier j and 1T on carrier k However, ambiguity 3 may still not be resolved completely. Therefore, further configuration (e.g., RRC) can indicate which of the two carriers should be selected in this ambiguity.

Philosophy 2-B: A UE can keep 1T on the new carrier and 1T on the third carrier (the one other than the previous carrier and the new carrier). This translates to the following behavior:
(ambiguity 1): Move to 1T on carrier j and 1T on carrier k
(ambiguity 2): Move to 1T on carrier i (or carrier j) and 1T on carrier k
(ambiguity 3):
  Move to 1T on carrier i and 1T on carrier k
  Move to 1T on carrier j and 1T on carrier k However, ambiguity 3 may still not be resolved completely. Therefore, further configuration (e.g., RRC) can indicate which of the two carriers should be selected in this ambiguity. For the above-described ambiguities 1-3 under philosophy 2-B, RRC configuration may be provided by the UE in indicate which of the three operations can be used.

Philosophy 3: One carrier may be a special carrier with higher importance, where it is favorable to keep one or two Tx chains configured on the carrier. Here, it is assumed that carrier 1 is the special carrier. When combined with Philosophy 1, the two cases may be distinguished as:

Behavior 1: The most (e.g., maximum) number of available Tx chains is targeted on carrier 1.
Behavior 2: 1 Tx chain is targeted on carrier 1.

In some embodiments, the usage of the behavior can be specified in the specification or determined via RRC configuration. This case translates to the following behavior:
(ambiguity 1):
  If j≠1, then move to 1T on carrier j and 1T on carrier 1.
  If j=1, then
    (Behavior 1): Move to 2T on carrier j.
    (Behavior 2): Move to 1T on carrier j and 1T on carrier i.
(ambiguity 2):
  If i≠1 (or j≠1), then move to 1T on carrier i (or carrier j) and 1T on carrier 1.
  If i=1 (or j=1), then
    (Behavior 1): Move to 2T on carrier i (or carrier j).
    (Behavior 2): Move to 1T on carrier i and 1T or carrier j.
(ambiguity 3):
  If k≠1: then move 1T on carrier k and 1T on carrier 1.
  If k=1, then
    (Behavior 1): Move to 2T on carrier k.
    (Behavior 2): Move to 2T on carrier k and 1T on either carrier i or carrier j (ambiguity 3-a to be resolved).

Thus, in accordance with the above-described rules for the ambiguities, if target carrier is not carrier 1, then move 1T to target carrier and 1T to carrier 1, otherwise, in Behavior 1, move 2T to target carrier, in Behavior 2, move 1T to target carrier and keep 1T on the previous carrier or on one of the previous carriers (ambiguity 3-a).

Philosophy 3: In some embodiments, the above-described behaviors can be generalized to account for an ordering of the set of carriers. Without loss of generality, the ordering of carriers may be assumed in terms of importance from carrier 1, then carrier 2, and then carrier 3. Then:
(ambiguity 1):
  If i and k do not have the same importance, then move 1T to carrier j and 1T to the carrier of higher importance between i and k.
  If i and k have the same importance, then move 1T to carrier j and 1T to carrier i.
(ambiguity 2):
  If j (or i) and k do not have the same importance, then move 1T to carrier i (or carrier j) and 1T to the carrier of higher importance between j (or i) and k.
  If j (or i) and k have the same importance, then move 1T to carrier j and 1T to carrier i.
(ambiguity 3):
  If i and j do not have the same importance, then move 1T to carrier k and 1T to the carrier of higher importance between i and j.
  If i and j have the same importance, then move 1T to carrier k and 1T to either carrier i or carrier j (ambiguity 3-b to be resolved).

Accordingly, the above-described rules for the ambiguities can be summarized to move 1T to the target carrier, and move 1T on the other carrier or one of the other carriers with the higher importance between the two other carriers (ambiguity 3-b). Ambiguities 3-a and 3-b may be resolved by specifying some rules for selecting one carrier between carriers i and j. Priorities of carriers may be established either by the specification or via RRC configurations for ambiguity solutions based on determining priorities of carriers.

Alternate Listing of the Switching Cases

In some embodiments, another way of listing switching cases may be based on previous and next transmissions, and some rules may be inferred in these cases. For example, switching time may be needed in the following cases (assume i, j, k$\in\{1,2,3\}$, i≠j≠k):

If previous transmission is 2P on carrier i
   If next transmission is 2P on carrier j
      Move to 2T on carrier j; switching time may be needed on carriers i and j.
   If next transmission is 1P on carrier j
      (ambiguity A): move to either
         2T on carrier j, i.e., assume 2P on carrier j; switching time may be needed on i and j.
         1T on carrier i and 1T on carrier j, i.e., assume 1P on carrier i and 1T on carrier j; switching time may be needed on i and j.
         1T on carrier j and 1T on carrier k, i.e., assume 1P on carrier j and 1T on carrier k; switching time may be needed on all carriers.
   If next transmission is 1P on carrier i
      (ambiguity B): move to either
         2T on carrier i, i.e., assume 2P on carrier i; no switching time needed.
         1T on carrier i and 1T on carrier j, i.e., assume 1P on carrier i and 1T on carrier j; switching time may be needed on i and j.

If previous transmission is 1P on carrier i
   If next transmission is 2P on carrier i
      Move to 2T on carrier i
         If current Tx state is 2T on carrier i
            No switching time may be needed.
         If current Tx state is 1T on carrier i and 1T on carrier j (carrier k)
            Switching time may be needed on carrier j (k).
   If next transmission is 2P on carrier j
      Move to 2T on carrier j;
         If current Tx state is 2T on carrier i
            Switching time may be needed on carrier i and j.
         If current Tx state is 1T on carrier i and 1T on carrier j
            Switching time may be needed on carrier i and j.
         If current Tx state is 1T on carrier i and 1T on carrier k
            Switching time may be needed on all carriers.
   If next transmission is 1P on carrier i
      (ambiguity C): move to either
         2T on carrier i, i.e., assume 2P on carrier i
            If current Tx state is 2T on carrier i
               No switching time may be needed.
            If current Tx state is 1T on carrier i and 1T on carrier j (k)
               Switching time may be needed on carrier i and j(k).
         1T on carrier i and 1T on carrier j, i.e., assume 1P on carrier i and 1T on carrier j
            If current Tx state is 2T on carrier i
               Switching time may be needed on carriers i and j.
            If current Tx state is 1T on carrier i and 1T on carrier j
               No switching time may be needed.
            If current Tx state is 1T on carrier i and 1T on carrier k; Switching time may be needed on carriers j and k.
         1T on carrier i and 1T on carrier k, i.e., assume 1P on carrier i and 1T on carrier k
            If current Tx state is 2T on carrier i
               Switching time may be needed on carriers i and k.
            If current Tx state is 1T on carrier i and 1T on carrier k
               No switching time may be needed.
            If current Tx state is 1T on carrier i and 1T on carrier j
               Switching time may be needed on carriers j and k.
   If next transmission is 1P on carrier j
      (ambiguity D): move to either
         2T on carrier j, i.e., assume 2P on carrier j
            If current Tx state is 2T on carrier i
               Switching time may be needed on carriers i and j.
            If current Tx state is 1T on carrier i and 1T on carrier j
               Switching time may be needed on carriers i and j.
            If current Tx state is 1T on carrier i and 1T on carrier k
               Switching time may be needed on all carriers.
         1T on carrier i and 1T on carrier j, i.e., assume 1P on carrier i and 1P on carrier j;
            If current Tx state is 2T on carrier i
               Switching time may be needed on carriers i and j.
            If current Tx state is 1T on carrier i and 1T on carrier j
               No switching time may be needed.
            If current Tx state is 1T on carrier i and 1T on carrier k
               Switching time may be needed on carriers j and k.
         1T on carrier j and 1T on carrier k, i.e., assume 1P on carrier j and 1P on carrier k
            If current Tx state is 2T on carrier i
               Switching time may be needed on all carriers.
            If current Tx state is 1T on carrier i and 1T on carrier j (carrier k)
               Switching time may be needed on carriers i and k (j).

Accordingly, resolving ambiguities may also be done using the above-described philosophies. Note that resolving each ambiguity can be done using different philosophy, i.e., not all ambiguities need to be resolved using the same philosophy.

Philosophy 1: A UE prepares for the maximum number of ports in the upcoming transmission.
   (ambiguity A): Move to 2T on carrier j.
   (ambiguity B): Move to 2T on carrier i.
   (ambiguity C): Move to 2T on carrier i.
   (ambiguity D): Move to 2T on carrier j.

Philosophy 2: A UE tries to minimize the number of interruption times across carriers. In doing so, the UE can try to keep as many Tx on carrier with previous transmission(s) as possible.
(ambiguity A): Move to 1T on carrier j and 1T on carrier i.
(ambiguity B): Move to 2T on carrier i.
(ambiguity C): Move to 2T on carrier i if current Tx state is 2T on carrier i, or move to 1T on carrier i and 1T on carrier j (carrier k) if current Tx state is 1T on carrier i and 1T on carrier j (carrier k).
(ambiguity D): Here, there can be two decisions:
  Philosophy 2-A: Move to 1T on carrier i and 1T on carrier j. In this version, a UE maintains 1T on carrier with previous transmission.
  Philosophy 2-B: Move to 1T on carrier j and 1T on carrier k. In this version, a UE maintains 1T on the other carrier (different than previous and target).
Philosophy 3: One carrier can be a special carrier with higher importance, where it is favorable to keep one or two Tx chains configured on the carrier. Assume that carrier i is the special one.
(ambiguity A): Move to 1T on carrier i and 1T on carrier j.
(ambiguity B): Move to 2T on carrier i.
(ambiguity C): Move to 2T on carrier i.
(ambiguity D): Move to 1T on carrier i and 1T on carrier j.
Assume that carrier j is the special one.
(ambiguity A): Move to 2T on carrier j.
(ambiguity B): Move to 1T on carrier i and 1T on carrier j.
(ambiguity C): Move to 1T on carrier i and 1T on carrier j.
(ambiguity D): Move to 2T on carrier j.
Assume that carrier k is the special one.
(ambiguity A): Move to 1T on carrier j and 1T on carrier k.
(ambiguity B): Not resolved using this philosophy.
(ambiguity C): Move to 1T on carrier i and 1T on carrier k.
(ambiguity D): Move to 1T on carrier j and 1T on carrier k.
Alternative-2 (Version 2)
In some embodiments, 1p transmissions are allowed on 1T+1T configurations.

TABLE 3

| Number of Tx chains in WID (Carrier 1 + Carrier 2 + Carrier 3) | Number of antenna ports for UL transmission (Carrier 1 + Carrier 2 + Carrier 3) |
| --- | --- |
| Case 1 | 0T + 0T + 2T | 0P + 0P + 2P |
| Case 2 | 0T + 1T + 1T | 0P + 0P + 1P, 0P + 1P + 0P |
| Case 3 | 0T + 2T + 0T | 0P + 2P + 0P |
| Case 4 | 1T + 1T + 0T | 1P + 0P + 0P, 0P + 1P + 0P |
| Case 5 | 2T + 0T + 0T | 2P + 0P + 0P |
| Case 6 | 1T + 0T + 1T | 1P + 0P + 0P, 0P + 0P + 1P |

This configuration only uses 2T configurations when sending 2p transmissions. It can be beneficial, e.g., if the UE is expected to operate in coverage limited scenarios and therefore it is more likely that 1p transmissions are going to be scheduled. In this scenario, it can help reduce switching time to keep the Tx configurations distributed between two carriers as much as possible. Some rules can be inferred in this case. For example, switching time may be needed in the following cases (assume i, j, k∈{1,2,3}, i≠j≠k).

If the current Tx configuration is 2T on carrier i, and
  Next transmission is a 2p transmission on carrier j. In this case, switching is to 2T on carrier j, switching time may be needed on carriers i and j.
  Next transmission is a 1p transmission on carrier i. In this case switching can be (ambiguity 1):
    To 1T on carrier i and 1T on carrier j; switching time may be needed on carrier i and carrier j.
    To 1T on carrier i and 1T on carrier k; switching time may be needed on carrier i and carrier k.
  Next transmission is a 1p transmission on carrier j. In this case switching can be (ambiguity 2):
    To 1T on carrier j and 1T on carrier i; switching time may be needed on carrier j and carrier i.
    To 1T on carrier j and 1T on carrier k; switching time may be needed on all three carriers.
If the current Tx configuration is 1T on carrier i and 1T on carrier j, and
  Next transmission is a 2p transmission on carrier i (or carrier j). In this case, switching is to 2T on carrier i (or carrier j); switching time may be needed on carriers i and j.
  Next transmission is a 2p transmission on carrier k. In this case, switching is to 2T on carrier k; switching time may be needed on all carriers.
  Next transmission is a 1p transmission on carrier i (or carrier j). In this case, switching can be (ambiguity 3).
    To 1T on carrier i and 1T on carrier j; no switching time may be required since no Tx configuration switching occurs.
    To 1T on carrier i (or carrier j) and 1T on carrier k; switching time may be needed on all carriers.
  Next transmission is a 1p transmission on carrier k. In this case, switching can be (ambiguity 4):
    To 1T on carrier k and 1T on carrier i; switching time may be needed on carriers j and k.
    To 1T on carrier k and 1T on carrier j; switching time may be needed on carriers i and k.
Variation 3 (with Constraint-1)
In some embodiments, this variation follows Constraint-1, where for a given 1T+1T configuration, only 1P on one particular carrier is allowed. Consider the following configuration, noting that it is without loss of generality due to the symmetry of all considered carriers.

TABLE 4

| Number of Tx chains in WID (Carrier 1 + Carrier 2 + Carrier 3) | Number of antenna ports for UL transmission (Carrier 1 + Carrier 2 + Carrier 3) |
| --- | --- |
| Case 1 | 0T + 0T + 2T | 0P + 0P + 1P, 0P + 0P + 2P |
| Case 2 | 0T + 1T + 1T | 0P + 0P + 1P |
| Case 3 | 0T + 2T + 0T | 0P + 1P + 0P, 0P + 2P + 0P |
| Case 4 | 1T + 1T + 0T | 0P + 1P + 0P |
| Case 5 | 2T + 0T + 0T | 1P + 0P + 0P, 2P + 0P + 0P |
| Case 6 | 1T + 0T + 1T | 1P + 0P + 0P |

1Tx-2Tx-2Tx
In some embodiments, there may be a carrier, for example carrier 1, that follow the 1Tx state, and carriers 2 and 3 that follow the 2Tx state.
1T+1T is Restrictively Allowed (Constraint-2)
In this case, the use of 1T+1T is allowed when carrier 1 is involved.
Variation 1 (with Constraint-1 on carrier 2 and carrier 3)
In this variation, Constraint-1 is applied on carrier 1, wherein only 1p transmissions are allowed on 1T+1T configurations. This follows the same spirit of Rel-16 operation. For example, this version operates in the same spirit of Rel-16 1Tx-2Tx switching, where carrier 1 (e.g., SUL) does not support 2p transmissions, and configurations with 1T at carrier 1 are allowed for 1p transmissions on carrier 1. In this configuration, one carrier, for example Carrier 1, does not support 2p transmissions, and therefore 2Tx configuration on carrier 1 is not possible. Carrier 1 is assumed to be without loss of generality.

TABLE 5

| | Number of Tx chains in WID (Carrier 1 + Carrier 2 + Carrier 3) | Number of antenna ports for UL transmission (Carrier 1 + Carrier 2 + Carrier 3) |
|---|---|---|
| Case 1 | 0T + 0T + 2T | 0P + 0P + 1P, 0P + 0P + 2P |
| Case 3 | 0T + 2T + 0T | 0P + 1P + 0P, 0P + 2P + 0P |
| Case 4 | 1T + 1T + 0T | 1P + 0P + 0P |
| Case 6 | 1T + 0T + 1T | 1P + 0P + 0P |

Accordingly, some rules may be inferred in this case. For example, switching time may be needed in the following cases (assume $i,j,k \in \{1,2,3\}$, $i \neq j \neq k$):
  If the current Tx configuration is 2T on carrier $i \neq 1$, and
    Next transmission is a 2p or 1p transmission on carrier $j \neq 1$. In this case, switching is to 2T on carrier j, switching time may be needed on carriers i and j.
    Next transmission is a 1p transmission on carrier 1. In this case, switching is to 1T on carrier 1 and 1T on carrier i; switching time may be needed on carriers 1 and i.
  If the current Tx configuration is 1T on carrier $i \neq 1$ and 1T on carrier 1, and
    Next transmission is a 1p or 2p transmission on carrier i (or carrier j). In this case, switching is to 1T on carrier i (or carrier j); switching time may be needed on carriers 1 and carrier i (or carrier j).
This can be succinctly described as follows:
  If the preceding state was 2T on a carrier and the next transmission is a 1p or 2p transmission on another carrier other than carrier 1, then move 2T to the another carrier and apply switching time on both carriers.
  If the preceding state was 2T on a carrier and a 1p transmission is scheduled on carrier 1, then move 1T to carrier 1 and apply switching time on both carriers.
  If the preceding state was 1T on a one carrier and 1T on carrier 1 and 1p or 2p transmission is scheduled on a second carrier different than carrier 1, then move 2T on the second carrier.
    If the second carrier is the same as the one carrier, then switching time may be needed on carrier 1 and the one carrier.
    If the second carrier is different than the one carrier, then switching time may be needed on all carriers.
Alternate Listing of the Switching Cases
This listing of switching cases may be based on the previous transmissions and next transmissions. Some rules can be inferred in this case. For example, switching time may be needed in the following cases (assume $i,j,k \in \{1,2,3\}$, $i \neq j \neq k$).
  If previous transmission is 1P/2P on carrier $i \neq 1$
    If next transmission is 1P/2P on carrier $j \neq 1$
      Move to 2T on carrier j; switching time may be needed on carriers i and j.
    If next transmission is 1P on carrier 1
      (ambiguity A): Move to either 1T on carrier 1 and 1T on carrier i, i.e., assume 1P on carrier 1 and 1P on carrier i; switching time may be needed on carriers 1 and i.
1T on carrier 1 and 1T on carrier j, i.e., assume 1P on carrier 1 and 1P on carrier j; switching time may be needed on all carriers.
  If previous transmission is 1P on carrier 1
    If next transmission is 1P/2P on carrier i
      Move to 2T on carrier j; switching time is need on carriers 1 and i.
    If next transmission is 1P on carrier 1
      (ambiguity B): Move to either:
        1T on carrier 1 and 1T on carrier i, i.e., assume 1P on carrier 1 and 1P on carrier i
          If current Tx configuration is 1T on carrier 1 and 1T on carrier i, then no switching time may be needed.
          If current Tx configuration is 1T on carrier 1 and 1T on carrier j, then switching time may be needed on carriers i and j.
        1T on carrier 1 and 1T on carrier j, i.e., assume 1P on carrier 1 and 1P on carrier j
          If current Tx configuration is 1T on carrier 1 and 1T on carrier j, then no switching time may be needed.
          If current Tx configuration is 1T on carrier 1 and 1T on carrier i, then switching time may be needed on carriers i and j.
Resolving the above ambiguities may be accomplished as follows:
  Philosophy 2: A UE can try to minimize interruption time
    (ambiguity A): Move to 1T on carrier 1 and 1T on carrier i.
    (ambiguity B): Stay on current Tx configuration.
  Philosophy 3: A UE can try to have a maximum number of Tx chains on a carrier with higher importance. If the carrier with higher importance is a carrier other than 1, then
    (ambiguity A): Move to 1T on carrier 1 and 1T on the high importance carrier.
    (ambiguity B): Move to 1T on carrier 1 and 1T on the high importance carrier.
Variation 2 (No Constraint-1)
In this variation, do not apply Constraint-1 on carrier 1 (any potential 1p transmission can be allowed on 1T+1T configurations).
Alternative-1
This version only utilizes configurations with 2T for 2p transmissions. Accordingly, this leads to the more frequent configuration of having 1T available in two carriers, which may be suitable when 1p transmissions are expected (e.g., coverage enhancement scenarios). Thus, in this configuration, one carrier, for example Carrier 1, does not support 2p transmissions, and therefore 2Tx configuration on carrier 1 is not possible. Carrier 1 here is assumed to be without loss of generality.

TABLE 6

| | Number of Tx chains in WID (Carrier 1 + Carrier 2 + Carrier 3) | Number of antenna ports for UL transmission (Carrier 1 + Carrier 2 + Carrier 3) |
|---|---|---|
| Case 1 | 0T + 0T + 2T | 0P + 0P + 2P |
| Case 3 | 0T + 2T + 0T | 0P + 2P + 0P |
| Case 4 | 1T + 1T + 0T | 1P + 0P + 0P, 0P + 1P + 0P |
| Case 6 | 1T + 0T + 1T | 1P + 0P + 0P, 0P + 0P + 1P |

In some embodiments, some rules can be inferred in this case. For example, switching time may be needed in the following cases (assume i,j,k∈{1,2,3}, i≠j≠k).
If the current Tx configuration is 2T on carrier i≠1, and
  Next transmission is a 2p on carrier j≠1—in this case, switching is to 2T on carrier j, switching time may be needed on carriers i and j.
  Next transmission is a 1p transmission on carrier 1. In this case, switching can be (ambiguity 1).
    To 1T on carrier 1 and 1T on carrier i; switching time may be needed on carriers 1 and i.
    To 1T on carrier 1 and 1T on carrier j; switching time may be needed on all carriers.
  Next transmission is a 1p transmission on carrier i. In this case, switching is to 1T on carrier 1 and 1T on carrier i; switching time may be needed on carriers 1 and i.
  Next transmission is a 1p transmission on carrier j. In this case, switching is to 1T on carrier 1 and 1T on carrier j; switching time may be needed on all carriers.
If the current Tx configuration is 1T on carrier i≠1 and 1T on carrier 1, and
  Next transmission is a 2p transmission on carrier i. In this case, switching is to 2T on carrier i; switching time may be needed on carriers 1 and carrier i.
  Next transmission is a 2p transmission on carrier j. In this case, switching is to 2T on carrier j; switching time may be needed on all carriers.
  Next transmission is a 1p transmission on carrier j. In this case, switching is to a 1T on carrier j and 1T on carrier 1; switching time may be needed on carrier i and carrier j.
Resolving ambiguity 1 can be done by some mechanisms. For example:
  Philosophy 1: Try to maximize the number of Tx chains configured on the target carrier: this leads to.
  Philosophy 2: Always maintaining minimum number of carriers where switching time may be needed: this leads to selecting 1T on carrier 1 and 1T on carrier i.
  Philosophy 3: Having some ordering of importance between carriers and preferring to have 1T configured on a higher importance carrier: in this case, if the carrier of higher importance is i over j, then the behavior is to switch to 1T on carrier 1 and 1T on carrier i, while if the carrier of high importance is j over i, then the behavior is to switch to 1T on carrier 1 and 1T on carrier j.
Accordingly, this can be succinctly described as follows:
If the preceding state was 2T on a carrier and the next transmission is a 2p transmission on another carrier other than carrier 1, then move 2T to the another carrier and apply switching time on both carriers.
If the preceding state was 2T on a one carrier and the next transmission is a 1p transmission on a second carrier, then move 1T to carrier 1 and 1T to the second carrier; apply switching time on Carrier 1 and the one carrier, and if the second carrier is not carrier 1, then apply switching time on the second carrier.
If the preceding state was 1T on a one carrier and 1T on carrier 1 and 2p transmission is scheduled on a second carrier, then move 2T on the second carrier; apply switching time on carrier 1 and the one carrier, and if the second carrier is different than the one carrier, then switching time may be needed on the second carrier.
If the preceding state was 1T on a one carrier and 1T on carrier 1 and 1p transmission is scheduled on a second carrier j≠1, then move to 1T on carrier 1 and 1T on carrier j; apply switching time on carrier i and carrier j.

Alternative-2

This variation is similar to Variation 2, with the difference that 1p transmissions can be allowed on carrier 2 and carrier 3 when 2 Tx are configured on those carriers.

TABLE 7

|  | Number of Tx chains in WID (Carrier 1 + Carrier 2 + Carrier 3) | Number of antenna ports for UL transmission (Carrier 1 + Carrier 2 + Carrier 3) |
| --- | --- | --- |
| Case 1 | 0T + 0T + 2T | 0P + 0P + 1P, 0P + 0P + 2P |
| Case 3 | 0T + 2T + 0T | 0P + 1P + 0P, 0P + 2P + 0P |
| Case 4 | 1T + 1T + 0T | 1P + 0P + 0P, 0P + 1P + 0P |
| Case 6 | 1T + 0T + 1T | 1P + 0P + 0P, 0P + 0P + 1P |

The differences in the switching operations compared to Variation 2 are ones shown below as follows.
If the current Tx configuration is 2T on carrier i≠1, and
  Next transmission is a 1p transmission on carrier i—in this case, switching can be (ambiguity 2)
    To 1T on carrier 1 and 1T on carrier i; switching time may be needed on carriers 1 and i.
    To 2T on carrier i≠1; no switching time may be needed
  Next transmission is a 1p transmission on carrier j—in this case, switching can be (ambiguity 3)
    To 2T on carrier j; switching time may be needed on carrier i and carrier j.
    To 1T on carrier 1 and 1T on carrier j; switching time may be needed on all carriers.
If the current Tx configuration is 1T on carrier i≠1 and 1T on carrier 1, and
  Next transmission is a 1p transmission on carrier j—in this case, switching can be (ambiguity 4)
    To 1T on carrier j and 1T on carrier 1; switching time may be needed on carrier i and carrier j.
    To 2T on carrier j; switching time may be needed on all carriers.
Resolving those ambiguities can be done according to the following behaviors:
  Philosophy 1: A UE can always configure Tx chains in preparation for the maximum number of ports used in the UL transmission. In this case, the behavior would be:
    (ambiguity 2): to 2T on carrier i.
    (ambiguity 3): to 2T on carrier j.
    (ambiguity 4): to 2T on carrier j.
  Philosophy 2: A UE can always go for the case which requires minimum number of switching times on carriers. In this case, the behavior would be:
    (ambiguity 2): to 2T on carrier i.
    (ambiguity 3): to 2T on carrier j.
    (ambiguity 4): to 1T on carrier j and 1T on carrier 1.
  Philosophy 3: A UE follows a particular order of importance in configuring Tx chains on carriers. For example, assume that Carrier 1 is most important, and therefore a UE always attempts to have 1 Tx on Carrier 1. In this case, the behavior would be:
    (ambiguity 2): to 1T on carrier 1 and 1T on carrier i.
    (ambiguity 3): to 1T on carrier 1 and 1T on carrier j.
    (ambiguity 4): to 1T on carrier j and 1T on carrier 1.
According to another example, assume that the ordering of importance of carriers is i≠1 then 1 then j≠1, where this ordering is without loss of generality. In this case, the behavior would be:

(ambiguity 2): to 2T on carrier i.
(ambiguity 3): to 1T on carrier 1 and 1T on carrier j.
(ambiguity 4): to 1T on carrier 1 and 1T on carrier j.
If the ordering is i then j then 1, the behavior would be:
(ambiguity 2): to 2T on carrier i.
(ambiguity 3): to 2T on carrier j.
(ambiguity 4): to 2T on carrier j.

Accordingly, this change can be succinctly described such that if the preceding state was 2T on a first carrier and the next transmission is a 1p transmission on a second carrier other than the first carrier, then move 1T to carrier 1 and 1T to the second carrier. Then apply switching time on Carrier 1 and the one carrier, and if the second carrier is not carrier 1, then apply switching time on the second carrier.

In some embodiments, the description of the UE switching behavior may be described according to a mapping technique. The following is based on Philosophy 2 for resolving ambiguities.

When the UE is to transmit a 2-port transmission on one uplink carrier on one band and if the preceding uplink transmission is a 1-port transmission on another uplink carrier on another band, then the UE is not expected to transmit for the duration of $N_{Tx1-Tx2}$ on any of the carriers.

For the UE configured with uplinkTxSwitchingOption set to 'switchedUL', when the UE is to transmit a 1-port transmission on one uplink carrier on one band and if the preceding uplink transmission is a 1-port transmission or a 2-port transmission on another uplink carrier on another band, then the UE is not expected to transmit for the duration of $N_{Tx1-Tx2}$ on any of the carriers. If the UE is to transmit a 1-port transmission on one uplink carrier on one band in which a UE can support 2-port transmission, then the UE shall consider as if 2-port transmission is transmitted on the one uplink carrier on one band.

If the UE is to transmit a 1-port transmission on one uplink carrier on one band in which a UE cannot support 2-port transmission, then the UE shall consider as if 1-port transmission is transmitted on the another uplink carrier on another band.

For the UE configured with uplinkTxSwitchingOption set to 'switchedUL', when the UE is to transmit a 1-port transmission on one uplink carrier on one band and if the preceding uplink transmission was a 1-port transmission on another uplink carrier on another band and the UE was in an operation state in which 2-port transmission is not supported on the another uplink carrier on another band, then the UE is not expected to transmit for the duration of $N_{Tx1-Tx2}$ on any of the carriers, and the UE shall consider this as if 2-port transmission cannot be transmitted on the one uplink carrier on one band.

1T+1T is Allowed (No Constraint-2)

In this case, Constraint-2 is violated between carrier 2 and carrier 3, i.e., 1T+1T is allowed between the two carriers.

Variation 1 (no Constraint-1)

This configuration allows having 1p transmissions for carrier 2 and carrier 3 within 1T+1T configurations.

TABLE 8

|  | Number of Tx chains in WID (Carrier 1 + Carrier 2 + Carrier 3) | Number of antenna ports for UL transmission (Carrier 1 + Carrier 2 + Carrier 3) |
| --- | --- | --- |
| Case 1 | 0T + 0T + 2T | 0P + 0P + 1P, 0P + 0P + 2P |
| Case 2 | 0T + 1T + 1T | 0P + 0P + 1P, 0P + 1P + 0P |
| Case 3 | 0T + 2T + 0T | 0P + 1P + 0P, 0P + 2P + 0P |
| Case 4 | 1T + 1T + 0T | 1P + 0P + 0P, 0P + 1P + 0P |
| Case 6 | 1T + 0T + 1T | 1P + 0P + 0P, 0P + 0P + 1P |

Accordingly, this configuration provides the most (e.g., maximum) amount of flexibility in terms of allowing 1p/2p transmissions given the Tx chain configuration, because it allows all possible transmission combinations allowed for the Tx configuration. However, there may be some ambiguity in mapping because multiple Tx configurations are allowed for the same transmission combination.

Variation 2 (with Constraint-1)

In this variation, 1p transmissions are allowed for carrier 2 and carrier 3 only in 2T configurations. Following this configuration may lead to the Variation 1 of (1T+1T restrictively allowed) case.

TABLE 9

|  | Number of Tx chains in WID (Carrier 1 + Carrier 2 + Carrier 3) | Number of antenna ports for UL transmission (Carrier 1 + Carrier 2 + Carrier 3) |
| --- | --- | --- |
| Case 1 | 0T + 0T + 2T | 0P + 0P + 1P, 0P + 0P + 2P |
| Case 3 | 0T + 2T + 0T | 0P + 1P + 0P, 0P + 2P + 0P |
| Case 4 | 1T + 1T + 0T | 1P + 0P + 0P |
| Case 6 | 1T + 0T + 1T | 1P + 0P + 0P |

1Tx-1Tx-2Tx

In this case, there may be two carriers, for example, carrier 1 and carrier 2, following the 1Tx state, while the last carrier, carrier 3, follows the 2Tx state.

1T+1T is Restrictively Allowed (with Constraint-2)

In this case, the use of 1T+1T on carrier 1 and carrier 2 is allowed, and carrier 3 may only be configured with 2T. This follows the spirit of Rel-16 for carriers 1 and 2 and Rel-17 for carrier 3.

TABLE 10

|  | Number of Tx chains in WID (Carrier 1 + Carrier 2 + Carrier 3) | Number of antenna ports for UL transmission (Carrier 1 + Carrier 2 + Carrier 3) |
| --- | --- | --- |
| Case 1 | 0T + 0T + 2T | 0P + 0P + 1P, 0P + 0P + 2P |
| Case 4 | 1T + 1T + 0T | 1P + 0P + 0P, 0P + 1P + 0P |

In some embodiments, some rules may be inferred in this case. For example, switching time may be needed in the following cases (assume $i,j,k \in i \neq j \neq k$). If the current Tx configuration is 2T on carrier 3, and next transmission is a 1p transmission on carrier $i \neq 3$, then switching is to 1T on carrier 1 and 1T on carrier 2, and switching time may be needed on all carriers. If the current Tx configuration is 1T on carrier 1 and 1T on carrier 2, and next transmission is a 1p or 2p transmission on carrier 3, then switching is to 2T on carrier 3, and switching time may be needed on all carriers. Thus, if the next transmission is on carrier 1 or carrier 2 (carrier 3), and at least one Tx state is configured on carrier 3 (carrier 1 or carrier 2), then switching time may be needed on all carriers.

1T+1T is Allowed (No Constraint-2)

In this case, 1T+1T is allowed with carrier 3.

Variation 1 (No Constraint-1)

In this case, 1T+1T with carrier 3 may include both 1p+0p and 0p+1p. Thus, one variation may be considered where 1T+1T is not used between carrier 1 and carrier 2 as shown below. This configuration allows 1T to be always configured on carrier 3 which can reduce the need for UL Tx switching if more transmissions are likely to be scheduled on carrier 3.

TABLE 11

| | Number of Tx chains in WID (Carrier 1 + Carrier 2 + Carrier 3) | Number of antenna ports for UL transmission (Carrier 1 + Carrier 2 + Carrier 3) |
|---|---|---|
| Case 1 | 0T + 0T + 2T | 0P + 0P + 1P, 0P + 0P + 2P |
| Case 2 | 0T + 1T + 1T | 0P + 0P + 1P, 0P + 1P + 0P |
| Case 6 | 1T + 0T + 1T | 1P + 0P + 0P, 0P + 0P + 1P |

In some embodiments, some rules can be inferred in this case. For example, switching time may be needed in the following cases (assume i,j,k∈{1,2,3}, i≠j≠k). If the current Tx configuration is 2T on carrier 3, and next transmission is a 1p transmission on carrier i≠3, then switching is to 1T on carrier i and 1T on carrier 3, and switching time may be needed on carriers i and 3. If the current Tx configuration is 1T on carrier i and 1T on carrier 3, and the next transmission is a 2p transmission on carrier 3, then switching is to 2T on carrier 3, and switching time may be needed on carrier i and carrier 3.

In some embodiments, the next transmission is a 1p transmission on carrier j≠3, thus switching is to 1T on carrier j and 1T on carrier 3, and switching time may be needed either on carrier i and carrier j, or on all carriers.

The UE switching behavior may be described according to a previous mapping technique such that, when the UE is to transmit a 2-port transmission on one uplink carrier on one band and if the preceding uplink transmission is a 1-port transmission on another uplink carrier on another band, then the UE is not expected to transmit for the duration of $N_{Tx1\text{-}Tx2}$ on any of the carriers. When the UE is to transmit a 1-port transmission on one uplink carrier on one band and if the preceding uplink transmission is a 2-port transmission on another uplink carrier on another band, then the UE is not expected to transmit for the duration of $N_{Tx1\text{-}Tx2}$ on any of the carriers. If Rel-18 capability is configured for the UE configured with uplinkTxSwitchingOption set to 'switchedUL', when the UE is to transmit a 1-port transmission on one uplink carrier on one band and if the preceding uplink transmission was a 1-port transmission on another uplink carrier on another band and the UE is under an operation state in which 1-port transmission cannot be supported on the another uplink carrier on another band, then the UE is not expected to transmit for the duration of $N_{Tx1\text{-}Tx2}$ on any of the carriers.

Another variation is when 1p transmission is not allowed on carrier 3 when on 2T configuration as shown below.

TABLE 12

| | Number of Tx chains in WID (Carrier 1 + Carrier 2 + Carrier 3) | Number of antenna ports for UL transmission (Carrier 1 + Carrier 2 + Carrier 3) |
|---|---|---|
| Case 1 | 0T + 0T + 2T | 0P + 0P + 2P |
| Case 2 | 0T + 1T + 1T | 0P + 0P + 1P, 0P + 1P + 0P |
| Case 6 | 1T + 0T + 1T | 1P + 0P + 0P, 0P + 0P + 1P |

Variation 2 (with Constraint-1)

In this case, only 1p+0p or 0p+1p is allowed with 1T+1T. One configuration can be considered as below, where 1T is always configured on carrier 3, but Rel-16 is adopted where 1p+0p is only allowed on 1T+1T configurations.

TABLE 13

| | Number of Tx chains in WID (Carrier 1 + Carrier 2 + Carrier 3) | Number of antenna ports for UL transmission (Carrier 1 + Carrier 2 + Carrier 3) |
|---|---|---|
| Case 1 | 0T + 0T + 2T | 0P + 0P + 1P, 0P + 0P + 2P |
| Case 2 | 0T + 1T + 1T | 0P + 1P + 0P |
| Case 6 | 1T + 0T + 1T | 1P + 0P + 0P |

In some embodiments, this case requires the following additional rule compared to Variation 1 above. If the current Tx configuration is 1T on carrier i and 1T on carrier 3, and the next transmission is a 1p transmission on carrier 3, then switching is to 2T on carrier 3, and switching time may be needed either on carrier i and carrier 3.

UL CA with Option 2

Version 1 gives the highest flexibility in terms of Tx configurations and the assignment of 1p/2p transmissions.

TABLE 14

| | Number of Tx chains in WID (Carrier 1 + Carrier 2 + Carrier 3) | Number of antenna ports for UL transmission (Carrier 1 + Carrier 2 + Carrier 3) |
|---|---|---|
| Case 1 | 0T + 0T + 2T | 0P + 0P + 1P, 0P + 0P + 2P |
| Case 2 | 0T + 1T + 1T | 0P + 0P + 1P, 0P + 1P + 0P, 0P + 1P + 1P |
| Case 3 | 0T + 2T + 0T | 0P + 1P + 0P, 0P + 2P + 0P |
| Case 4 | 1T + 1T + 0T | 1P + 0P + 0P, 0P + 1P + 0P, 1P + 1P + 0P |
| Case 5 | 2T + 0T + 0T | 1P + 0P + 0P, 2P + 0P + 0P |
| Case 6 | 1T + 0T + 1T | 1P + 0P + 0P, 0P + 0P + 1P, 1P + 0P + 1P |

Some rules may be inferred in this case. For example, switching time may be needed in the following cases (assume i,j,k∈i≠j≠k).

If the current Tx configuration is 2T on carrier i, and
  Next transmission is a 2p transmission on carrier j—in this case, switching is to 2T on carrier j, switching time may be needed on carriers i and j.
  Next transmission is a 1p transmission on carrier j—in this case switching can be (ambiguity 1)
    To 2T on carrier j, switching time may be needed on carriers i and j
    To 1T on carrier j and 1T on carrier i; switching time may be needed on carrier i and carrier j.
    To 1T on carrier j and 1T on carrier k; switching time may be needed on all three carriers.
  Next transmission is a 1p transmission on carrier i and 1p transmission on carrier j—in this case switching is to 1T on carrier i and 1T on carrier j; switching time may be needed on carrier i and carrier j.
  Next transmission is a 1p transmission on carrier j and 1p transmission on carrier k—in this case switching is to 1T on carrier j and 1T on carrier k; switching time may be needed on all carriers.
If the current Tx configuration is 1T on carrier i and 1T on carrier j, and
  Next transmission is a 2p transmission on carrier i (or carrier j)—in this case, switching is to 2T on carrier i (or carrier j); switching time may be needed on carriers i and j.
  Next transmission is a 2p transmission on carrier k—in this case, switching is to 2T on carrier k; switching time may be needed on all carriers.
  Next transmission is a 1p transmission on carrier i (or carrier j)—in this case, switching can be (ambiguity 2)

To 2T on carrier i (or carrier j); switching time may be needed on carriers i and j.

To 1T on carrier i and 1T on carrier j; no switching time may be required since no Tx configuration switching occurs.

To 1T on carrier i (or carrier j) and 1T on carrier k; switching time may be needed on all carriers.

Next transmission is a 1p transmission on carrier k—in this case, switching can be (ambiguity 3)

To 2T on carrier k; switching time may be needed on carriers i and j.

To 1T on carrier k and 1T on carrier i; switching time may be needed on carriers j and k.

To 1T on carrier k and 1T on carrier j; switching time may be needed on carriers i and k.

Next transmission is a 1p transmission on carrier i (or carrier j) and 1p transmission on carrier k—in this case, switching is to 1T on carrier i (or carrier j) and 1T on carrier k; switching time may be needed on all carriers.

In some embodiments, this option is a direct extension of Version 1 in the case of SUL and UL CA with Option 1, and therefore mechanisms for solving ambiguities in this case can be reused here.

Alternate Listing of the Switching Cases

In this listing, the switching cases may be specified in terms of previous transmissions and next transmissions, rather than being specified based on current Tx state. Some rules can be inferred in this case. For example, switching time may be needed in the following cases (assume i,j,k∈{1, 2,3}, i≠j≠k).

If previous transmission is 2P on carrier i
  If next transmission is 2P on carrier j
    Move to 2T on carrier j; switching time may be needed on carriers i and j.
  If next transmission is 1P on carrier i and 1P on carrier j
    Move to 1T on carrier i and 1T on carrier j; switching time may be needed on i and j.
  If next transmission is 1P on carrier j and 1P on carrier k
    Move to 1T on carrier j and 1T on carrier k; switching time may be needed on all carriers.
  If next transmission is 1P on carrier j
    (ambiguity A): Move to either
      2T on carrier j, i.e., assume 2P on carrier j; switching time may be needed on i and j.
      1T on carrier i and 1T on carrier j, i.e., assume 1P on carrier i and 1P on carrier j; switching time may be needed on i and j.
      1T on carrier j and 1T on carrier k, i.e., assume 1P on carrier j and 1P on carrier k; switching time may be needed on all carriers.
  If next transmission is 1P on carrier i
    (ambiguity B): Move to either
      2T on carrier i, i.e., assume 2P on carrier i; no switching time needed.
      1T on carrier i and 1T on carrier j, i.e., assume 1P on carrier i and 1P on carrier j; switching time may be needed on i and j.

If previous transmission is 1P on carrier i and 1P on carrier j
  If next transmission is 2P on carrier i (carrier j)
    Move to 2T on carrier i (carrier j); switching time may be needed on i and j (red also).
  If next transmission is 2P on carrier k
    Move to 2T on carrier k; switching time may be needed on all carriers.
  If next transmission is 1P on carrier i (carrier j) and 1P on carrier k
    Move to 1T on carrier i (carrier j) and 1T on carrier k; switching time may be needed on all carriers.
  If next transmission is 1P on carrier i (carrier j)
    (ambiguity C): move to either
      2T on carrier i (carrier j), i.e., assume 2P on carrier i (carrier j); switching time may be needed on i and j.
      1T on carrier i and 1T on carrier j, i.e., assume 1P on carrier i and 1P on carrier j; no switching time may be needed.
      1T on carrier i (carrier j) and 1T on carrier k, i.e., assume 1P on carrier i (carrier j) and 1P on carrier k; switching time may be needed on all carriers.
  If next transmission is 1P on carrier k
    (ambiguity D): move to either
      2T on carrier k, i.e., assume 2P on carrier k; switching time may be needed on all carriers.
      1T on carrier i and 1T on carrier k, i.e., assume 1P on carrier i and 1P on carrier k; switching time may be needed on carrier j and k.
      1T on carrier j and 1T on carrier k, i.e., assume 1P on carrier j and 1P on carrier k; switching time may be needed on carrier i and k.

If previous transmission is 1P on carrier i
  If next transmission is 2P on carrier i
    Move to 2T on carrier i
      If current Tx state is 2T on carrier i
        No switching time may be needed.
      If current Tx state is 1T on carrier i and 1T on carrier j (carrier k)
        Switching time may be needed on carrier j (k).
  If next transmission is 2P on carrier j
    Move to 2T on carrier j;
      If current Tx state is 2T on carrier i
        Switching time may be needed on carrier i and j.
      If current Tx state is 1T on carrier i and 1T on carrier j
        Switching time may be needed on carrier i and j.
      If current Tx state is 1T on carrier i and 1T on carrier k
        Switching time may be needed on all carriers.
  If next transmission is 1P on carrier i and 1P on carrier j
    Move to 1T on carrier i and 1T on carrier j
      If current Tx state is 2T on carrier i
        Switching time may be needed on carriers i and j.
      If current Tx state is 1T on carrier i and 1T on carrier j
        No switching time may be needed.
      If current Tx state is 1T on carrier i and 1T on carrier k
        Switching time may be needed on carriers j and k.
  If next transmission is 1P on carrier j and 1P on carrier k
    Move to 1T on carrier j and 1T on carrier k
      If current Tx state is 2T on carrier i
        Switching time may be needed on all carriers.

If current Tx state is 1T on carrier i and 1T on carrier j (carrier k)

Switching time may be needed on carrier i and k (j).

If next transmission is 1P on carrier i (ambiguity E): Move to either 2T on carrier i, i.e., assume 2P on carrier i If current Tx state is 2T on carrier i No switching time may be needed.

If current Tx state is 1T on carrier i and 1T on carrier j (k)

Switching time may be needed on carrier i and j (k).

1T on carrier i and 1T on carrier j (carrier k), i.e., assume 1P on carrier i and 1T on carrier j (carrier k)

If current Tx state is 2T on carrier i

Switching time may be needed on carriers i and j (k).

If current Tx state is 1T on carrier i and 1T on carrier j (k)

No switching time may be needed.

If current Tx state is 1T on carrier i and 1T on carrier k(j)

Switching time may be needed on carriers j and k.

If next transmission is 1P on carrier j (ambiguity F): Move to either 2T on carrier j, i.e., assume 2P on carrier j If current Tx state is 2T on carrier i Switching time may be needed on carriers i and j.

If current Tx state is 1T on carrier i and 1T on carrier j

Switching time may be needed on carriers i and j.

If current Tx state is 1T on carrier i and 1T on carrier k

Switching time may be needed on all carriers.

1T on carrier i and 1T on carrier j, i.e., assume 1P on carrier i and 1T on carrier j;

If current Tx state is 2T on carrier i

Switching time may be needed on carriers i and j.

If current Tx state is 1T on carrier i and 1T on carrier j

No switching time may be needed.

If current Tx state is 1T on carrier i and 1T on carrier k

Switching time may be needed on carriers j and k.

1T on carrier j and 1T on carrier k, i.e., assume 1P on carrier j and 1T on carrier k If current Tx state is 2T on carrier i Switching time may be needed on all carriers.

If current Tx state is 1T on carrier i and 1T on carrier j (carrier k)

Switching time may be needed on carriers i and k (j).

Version 2 is an extension of Version 2 in the case of SUL and UL CA with Option 1.

TABLE 15

| | Number of Tx chains in WID (Carrier 1 + Carrier 2 + Carrier 3) | Number of antenna ports for UL transmission (Carrier 1 + Carrier 2 + Carrier 3) |
|---|---|---|
| Case 1 | 0T + 0T + 2T | 0P + 0P + 2P |
| Case 2 | 0T + 1T + 1T | 0P + 0P + 1P, 0P + 1P + 0P, 0P + 1P + 1P |
| Case 3 | 0T + 2T + 0T | 0P + 2P + 0P |
| Case 4 | 1T + 1T + 0T | 1P + 0P + 0P, 0P + 1P + 0P, 1P + 1P + 0P |
| Case 5 | 2T + 0T + 0T | 2P + 0P + 0P |
| Case 6 | 1T + 0T + 1T | 1P + 0P + 0P, 0P + 0P + 1P, 1P + 0P + 1P |

According to some embodiments, this configuration only uses 2T configurations when sending 2p transmissions. It can be beneficial, e.g., if the UE is expected to operate in coverage limited scenarios and therefore it is more likely that 1p transmissions are going to be scheduled. In this scenario, it can help reduce switching time to keep the Tx configurations distributed between two carriers as much as possible. Some rules can be inferred in this case. For example, switching time may be needed in the following cases (assume i,j,k∈{1,2,3}, i≠j≠k).

If the current Tx configuration is 2T on carrier i, and

Next transmission is a 2p transmission on carrier j—in this case, switching is to 2T on carrier j, switching time may be needed on carriers i and j Next transmission is a 1p transmission on carrier i—in this case switching can be (ambiguity 1)

To 1T on carrier i and 1T on carrier j; switching time may be needed on carrier i and carrier j.

To 1T on carrier i and 1T on carrier k; switching time may be needed on carrier i and carrier k.

Next transmission is a 1p transmission on carrier j—in this case switching can be (ambiguity 2)

To 1T on carrier j and 1T on carrier i; switching time may be needed on carrier j and carrier i.

To 1T on carrier j and 1T on carrier k; switching time may be needed on all three carriers.

Next transmission is 1p transmission on carrier i and 1p transmission on carrier j—in this case switching is to 1T on carrier i and 1T on carrier j; switching time may be needed on carrier i and carrier j.

Next transmission is 1p transmission on carrier i and 1p transmission on carrier k—in this case switching is to 1T on carrier i and 1T on carrier k; switching time may be needed on all carriers.

If the current Tx configuration is 1T on carrier i and 1T on carrier j, and

Next transmission is a 2p transmission on carrier i (or carrier j)—in this case, switching is to 2T on carrier i (or carrier j); switching time may be needed on carriers i and j.

Next transmission is a 2p transmission on carrier k—in this case, switching is to 2T on carrier k; switching time may be needed on all carriers.

Next transmission is a 1p transmission on carrier i (or carrier j)—in this case, switching can be (ambiguity 3).

To 1T on carrier i and 1T on carrier j; no switching time may be required since no Tx configuration switching occurs.

To 1T on carrier i (or carrier j) and 1T on carrier k; switching time may be needed on all carriers.

Next transmission is a 1p transmission on carrier k—in this case, switching can be (ambiguity 4)

To 1T on carrier k and 1T on carrier i; switching time may be needed on carriers j and k.

To 1T on carrier k and 1T on carrier j; switching time may be needed on carriers i and k.

Next transmission is a 1p transmission on carrier i (or carrier j) and 1p transmission on carrier k—in this case, switching is to 1T on carrier i (or carrier j) and 1T on carrier k; switching time may be needed on all carriers.

This option is an extension of Version 2 in the case of SUL and UL CA with Option 1, and therefore mechanisms for solving ambiguities in this case can be reused here.

Version 3 (1Tx-2Tx-2Tx)

This case considers UL CA option 2 when one carrier can support only up to 1Tx configuration.

TABLE 16

| Number of Tx chains in WID (Carrier 1 + Carrier 2 + Carrier 3) | Number of antenna ports for UL transmission (Carrier 1 + Carrier 2 + Carrier 3) |
| --- | --- |
| Case 1 | 0T + 0T + 2T | 0P + 0P + 1P, 0P + 0P + 2P |
| Case 2 | 0T + 1T + 1T | 0P + 0P + 1P, 0P + 1P + 0P, 0P + 1P + 1P |
| Case 3 | 0T + 2T + 0T | 0P + 1P + 0P, 0P + 2P + 0P |
| Case 4 | 1T + 1T + 0T | 1P + 0P + 0P, 1P + 1P + 0P |
| Case 6 | 1T + 0T + 1T | 1P + 0P + 0P, 1P + 1P + 0P |

In some embodiments, some rules can be inferred in this case. For example, switching time may be needed in the following cases (assume $i,j,k \in \{1,2,3\}$, $i \neq j \neq k$).

If the current Tx configuration is 2T on carrier $i \neq 1$, and

Next transmission is a 2p transmission on carrier $j \neq 1$—in this case, switching is to 2T on carrier j, switching time may be needed on carriers i and j.

Next transmission is a 1p transmission on carrier $j \neq 1$—in this case switching can be (ambiguity 1)

To 2T on carrier j; switching time may be needed on carrier j and carrier i.

To 1T on carrier i and 1T on carrier j; switching time may be needed on carrier j and carrier i.

To 1T on carrier j and 1T on carrier 1; switching time may be needed on all three carriers.

Next transmission is a 1p transmission on carrier 1—in this case switching can be (ambiguity 2)

To 1T on carrier 1 and 1T on carrier i; switching time may be needed on carrier 1 and carrier i.

To 1T on carrier 1 and 1T on carrier j; switching time may be needed on all three carriers.

Next transmission is 1p transmission on carrier i and 1p transmission on carrier j—in this case switching is to 1T on carrier i and 1T on carrier j; switching time may be needed on carrier i and carrier j.

Next transmission is 1p transmission on carrier j and 1p transmission on carrier k—in this case switching is to 1T on carrier i and 1T on carrier k; switching time may be needed on all carriers.

If the current Tx configuration is 1T on carrier i and 1T on carrier j, and

Next transmission is a 2p transmission on carrier i (or carrier j)—in this case, switching is to 2T on carrier i (or carrier j); switching time may be needed on carriers i and j.

Next transmission is a 2p transmission on carrier k—in this case, switching is to 2T on carrier k; switching time may be needed on all carriers.

Next transmission is a 1p transmission on carrier $i \neq 1$ (or carrier $j \neq 1$)—in this case, switching can be (ambiguity 3)

To 2T on carrier i (or carrier j); switching time may be required on carrier i and carrier j.

To 1T on carrier i and 1T on carrier j; no switching time may be required since no Tx configuration switching occurs.

To 1T on carrier i (or carrier j) and 1T on carrier k; switching time may be needed on all carriers.

Next transmission is a 1p transmission on carrier i=1— in this case, switching can be (ambiguity 4)

To 1T on carrier i and 1T on carrier j; no switching time may be required since no Tx configuration switching occurs.

To 1T on carrier i and 1T on carrier k; switching time may be needed on all carriers.

Next transmission is a 1p transmission on carrier i (or carrier j) and 1p transmission on carrier k—in this case, switching is to 1T on carrier i (or carrier j) and 1T on carrier k; switching time may be needed on all carriers Alternate Listing of the Switching Cases In this listing, the switching cases may be specified in terms of previous transmissions and next transmissions, rather than being specified based on current Tx state. Accordingly, some rules may be inferred in this case. For example, switching time may be needed in the following cases (assume $i,j,k \in \{1,2,3\}$, $i \neq j \neq k$).

If previous transmission is 2P on carrier i

If next transmission is 2P on carrier j

Move to 2T on carrier j; switching time may be needed on carriers i and j.

If next transmission is 1P on carrier i and 1P on carrier j

Move to 1T on carrier i and 1T on carrier j; switching time may be needed on i and j.

If next transmission is 1P on carrier j and 1P on carrier k

Move to 1T on carrier j and 1T on carrier k; switching time may be needed on all carriers.

If next transmission is 1P on carrier $j \neq 1$ (ambiguity A): Move to either 2T on carrier j, i.e., assume 2P on carrier j; switching time may be needed on i and j.

1T on carrier i and 1T on carrier j, i.e., assume 1P on carrier i and 1P on carrier j; switching time may be needed on i and j.

1T on carrier j and 1T on carrier k, i.e., assume 1P on carrier j and 1P on carrier k; switching time may be needed on all carriers.

If next transmission is 1P on carrier j=1

(ambiguity A1): Move to either 1T on carrier i and 1T on carrier j, i.e., assume 1P on carrier i and 1P on carrier j; switching time may be needed on i and j.

1T on carrier j and 1T on carrier k, i.e., assume 1P on carrier j and 1P.

If next transmission is 1P on carrier i (ambiguity B): Move to either 2T on carrier i, i.e., assume 2P on carrier i; no switching time needed.

1T on carrier i and 1T on carrier j, i.e., assume 1P on carrier i and 1P on carrier j; switching time may be needed on i and I.

If previous transmission is 1P on carrier i and 1P on carrier j
  If next transmission is 2P on carrier i (carrier j)
    Move to 2T on carrier i (carrier j); switching time may be needed on i and j (red also).
  If next transmission is 2P on carrier k
    Move to 2T on carrier k; switching time may be needed on all carriers.
  If next transmission is 1P on carrier i (carrier j) and 1P on carrier k
    Move to 1T on carrier i (carrier j) and 1T on carrier k; switching time may be needed on all carriers.
  If next transmission is 1P on carrier i≠1 (carrier j≠1)
    (ambiguity C): Move to either
      2T on carrier i (carrier j), i.e., assume 2P on carrier i (carrier j); switching time may be needed on i and j.
      1T on carrier i and 1T on carrier j, i.e., assume 1P on carrier i and 1P on carrier j; no switching time may be needed.
      1T on carrier i (carrier j) and 1T on carrier k, i.e., assume 1P on carrier i (carrier j) and 1P on carrier k; switching time may be needed on all carriers.
  If next transmission is 1P on carrier i=1
    (ambiguity C1): Move to either
      1T on carrier i and 1T on carrier j, i.e., assume 1P on carrier i and 1P on carrier j; no switching time may be needed.
      1T on carrier i and 1T on carrier k, i.e., assume 1P on carrier i and 1P on carrier k; switching time may be needed on all carriers.
  If next transmission is 1P on carrier k≠1
    (ambiguity D): Move to either
      2T on carrier k, i.e., assume 2P on carrier k; switching time may be needed on all carriers.
      1T on carrier i and 1T on carrier k, i.e., assume 1P on carrier i and 1P on carrier k; switching time may be needed on carrier j and k.
      1T on carrier j and 1T on carrier k, i.e., assume 1P on carrier j and 1P on carrier k; switching time may be needed on carrier i and k.
  If next transmission is 1P on carrier k=1
    (ambiguity D1): Move to either
      1T on carrier i and 1T on carrier k, i.e., assume 1P on carrier i and 1P on carrier k; switching time may be needed on carrier j and k.
      1T on carrier j and 1T on carrier k, i.e., assume 1P on carrier j and 1P on carrier k; switching time may be needed on carrier i and k.

If previous transmission is 1P on carrier i
  If next transmission is 2P on carrier i
    Move to 2T on carrier i
      If current Tx state is 2T on carrier i
        No switching time may be needed.
      If current Tx state is 1T on carrier i and 1T on carrier j (carrier k)
        Switching time may be needed on carrier j (k).
  If next transmission is 2P on carrier j
    Move to 2T on carrier j;
      If current Tx state is 2T on carrier i
        Switching time may be needed on carrier i and j.
      If current Tx state is 1T on carrier i and 1T on carrier j
        Switching time may be needed on carrier i and j.
      If current Tx state is 1T on carrier i and 1T on carrier k
        Switching time may be needed on all carriers.
  If next transmission is 1P on carrier i and 1P on carrier j
    Move to 1T on carrier i and 1T on carrier j
      If current Tx state is 2T on carrier i
        Switching time may be needed on carriers i and j.
      If current Tx state is 1T on carrier i and 1T on carrier j
        No switching time may be needed.
      If current Tx state is 1T on carrier i and 1T on carrier k
        Switching time may be needed on carriers j and k.
  If next transmission is 1P on carrier j and 1P on carrier k
    Move to 1T on carrier j and 1T on carrier k
      If current Tx state is 2T on carrier i
        Switching time may be needed on all carriers.
      If current Tx state is 1T on carrier i and 1T on carrier j (carrier k)
        Switching time may be needed on carrier i and k (j).
  If next transmission is 1P on carrier i≠1
    (ambiguity E): Move to either
      2T on carrier i, i.e., assume 2P on carrier i
        If current Tx state is 2T on carrier i
          No switching time may be needed.
        If current Tx state is 1T on carrier i and 1T on carrier j (k)
          Switching time may be needed on carrier i and j (k).
      1T on carrier i and 1T on carrier j (carrier k), i.e., assume 1P on carrier i and 1T on carrier j (carrier k)
        If current Tx state is 2T on carrier i
          Switching time may be needed on carriers i and j (k).
        If current Tx state is 1T on carrier i and 1T on carrier j (k)
          No switching time may be needed.
        If current Tx state is 1T on carrier i and 1T on carrier k (j)
          Switching time may be needed on carriers j and k.
  If next transmission is 1P on carrier i=1
    (ambiguity E1): Move to either
      1T on carrier i and 1T on carrier j (carrier k), i.e., assume 1P on carrier i and 1T on carrier j (carrier k)
        If current Tx state is 1T on carrier i and 1T on carrier j (k)
          No switching time may be needed.
        If current Tx state is 1T on carrier i and 1T on carrier k (j)
          Switching time may be needed on carriers j and k.
  If next transmission is 1P on carrier j≠1
    (ambiguity F): Move to either
      2T on carrier j, i.e., assume 2P on carrier j
        If current Tx state is 2T on carrier i Switching time may be needed on carriers i and j.
If current Tx state is 1T on carrier i and 1T on carrier j
Switching time may be needed on carriers i and j.
If current Tx state is 1T on carrier i and 1T on carrier
Switching time may be needed on all carriers.
1T on carrier i and 1T on carrier j, i.e., assume 1P on carrier i and 1T on carrier j;
  If current Tx state is 2T on carrier i
  Switching time may be needed on carriers i and j.
  If current Tx state is 1T on carrier i and 1T on carrier j
  No switching time may be needed.
  If current Tx state is 1T on carrier i and 1T on carrier k
  Switching time may be needed on carriers j and k.
1T on carrier j and 1T on carrier k, i.e., assume 1P on carrier j and 1T on carrier k
  If current Tx state is 2T on carrier i
  Switching time may be needed on all carriers.
  If current Tx state is 1T on carrier i and 1T on carrier j (carrier k)
  Switching time may be needed on carriers i and k (j).

If next transmission is 1P on carrier j=1
  (ambiguity F1): Move to either
    1T on carrier i and 1T on carrier j, i.e., assume 1P on carrier i and 1T on carrier j;
    If current Tx state is 2T on carrier i
    Switching time may be needed on carriers i and j.
    If current Tx state is 1T on carrier i and 1T on carrier j
    No switching time may be needed.
    If current Tx state is 1T on carrier i and 1T on carrier k
    Switching time may be needed on carriers j and k.
    1T on carrier j and 1T on carrier k, i.e., assume 1P on carrier j and 1T on carrier k
    If current Tx state is 2T on carrier i
    Switching time may be needed on all carriers.
    If current Tx state is 1T on carrier i and 1T on carrier j (carrier k)
    Switching time may be needed on carriers i and k (j).

Version 4 (1Tx-1Tx-2Tx)

This case considers UL CA option 2 when two carrier can support only up to 1Tx configuration.

TABLE 16

| Number of Tx chains in WID (Carrier 1 + Carrier 2 + Carrier 3) | Number of antenna ports for UL transmission (Carrier 1 + Carrier 2 + Carrier 3) |
| --- | --- |
| Case 1 | 0T + 0T + 2T | 0P + 0P + 1P, 0P + 0P + 2P |
| Case 2 | 0T + 1T + 1T | 0P + 0P + 1P, 0P + 1P + 0P, 0P + 1P + 1P |
| Case 4 | 1T + 1T + 0T | 1P + 0P + 0P, 0P + 1P + 0P, 1P + 1P + 0P |

TABLE 16-continued

| Number of Tx chains in WID (Carrier 1 + Carrier 2 + Carrier 3) | Number of antenna ports for UL transmission (Carrier 1 + Carrier 2 + Carrier 3) |
| --- | --- |
| Case 6 | 1T + 0T + 1T | 1P + 0P + 0P, 0P + 0P + 1P, 1P + 0P + 1P |

In some embodiments, some rules can be inferred in this case. For example, switching time may be needed in the following cases (assume i,j,k∈{1,2,3}, i≠j≠k).

If the current Tx configuration is 2T on carrier i, and
  Next transmission is a 1p transmission on carrier j—in this case switching can be (ambiguity 1)
    To 1T on carrier j and 1T on carrier i; switching time may be needed on carrier i and carrier j.
    To 1T on carrier j and 1T on carrier k; switching time may be needed on all three carriers.
  Next transmission is a 1p transmission on carrier i and 1p transmission on carrier j—in this case switching is to 1T on carrier i and 1T on carrier j; switching time may be needed on carrier i and carrier j.
  Next transmission is a 1p transmission on carrier j and 1p transmission on carrier k—in this case switching is to 1T on carrier j and 1T on carrier k; switching time may be needed on all carriers.

If the current Tx configuration is 1T on carrier i and 1T on carrier j, and
  Next transmission is a 2p transmission on carrier i (or carrier j)—in this case, switching is to 2T on carrier i (or carrier j); switching time may be needed on carriers i and j.
  Next transmission is a 2p transmission on carrier k—in this case, switching is to 2T on carrier k; switching time may be needed on all carriers.
  Next transmission is a 1p transmission on carrier i=3—in this case, switching can be (ambiguity 2)
    To 2T on carrier i; switching time may be needed on carriers i and j.
    To 1T on carrier i and 1T on carrier j; no switching time may be required since no Tx configuration switching occurs.
    To 1T on carrier i and 1T on carrier k; switching time may be needed on all carriers.
  Next transmission is a 1p transmission on carrier i≠3 (or carrier j≠3)—in this case, switching can be (ambiguity 2A)
    To 1T on carrier i and 1T on carrier j; no switching time may be required since no Tx configuration switching occurs.
    To 1T on carrier i (or carrier j) and 1T on carrier k; switching time may be needed on all carriers.
  Next transmission is a 1p transmission on carrier k=3—in this case, switching can be (ambiguity 3)
    To 2T on carrier k; switching time may be needed on carriers i and j.
    To 1T on carrier k and 1T on carrier i; switching time may be needed on carriers j and k.
    To 1T on carrier k and 1T on carrier j; switching time may be needed on carriers i and k.
  Next transmission is a 1p transmission on carrier k≠3—in this case, switching can be (ambiguity 3A)
    To 1T on carrier k and 1T on carrier i; switching time may be needed on carriers j and k.
    To 1T on carrier k and 1T on carrier j; switching time may be needed on carriers i and k.
  Next transmission is a 1p transmission on carrier i (or carrier j) and 1p transmission on carrier k—in this case, switching is to 1T on carrier i (or carrier j) and 1T on carrier k; switching time may be needed on all carriers.

Alternate Listing of the Switching Cases

In this listing, the switching cases are specified in terms of previous transmissions and next transmissions, rather than being specified based on current Tx state. Accordingly, some rules can be inferred in this case. For example, switching time may be needed in the following cases (assume i,j,k∈{1,2,3}, i≠j≠k).

If previous transmission is 2P on carrier i
    If next transmission is 1P on carrier i and 1P on carrier j
        Move to 1T on carrier i and 1T on carrier j; switching time may be needed on i and j.
    If next transmission is 1P on carrier j and 1P on carrier k
        Move to 1T on carrier j and 1T on carrier k; switching time may be needed on all carriers.
    If next transmission is 1P on carrier j
        (ambiguity A): Move to either
            1T on carrier i and 1T on carrier j, i.e., assume 1P on carrier i and 1P on carrier j; switching time may be needed on i and j.
            1T on carrier j and 1T on carrier k, i.e., assume 1P on carrier j and 1P on carrier k; switching time may be needed on all carriers.
    If next transmission is 1P on carrier i
        (ambiguity B): Move to either
            2T on carrier i, i.e., assume 2P on carrier i; no switching time needed.
            1T on carrier i and 1T on carrier j, i.e., assume 1P on carrier i and 1P on carrier j; switching time may be needed on i and j.

If previous transmission is 1P on carrier i and 1P on carrier j
    If next transmission is 2P on carrier i (carrier j)
        Move to 2T on carrier i (carrier j); switching time may be needed on i and j.
    If next transmission is 2P on carrier k
        Move to 2T on carrier k; switching time may be needed on all carriers.
    If next transmission is 1P on carrier i (carrier j) and 1P on carrier k
        Move to 1T on carrier i (carrier j) and 1T on carrier k; switching time may be needed on all carriers.
    If next transmission is 1P on carrier i=2
        (ambiguity C): Move to either
            2T on carrier i, i.e., assume 2P on carrier i; switching time may be needed on i and j.
            1T on carrier i and 1T on carrier j, i.e., assume 1P on carrier i and 1P on carrier j; no switching time may be needed.
            1T on carrier i and 1T on carrier k, i.e., assume 1P on carrier i and 1P on carrier k; switching time may be needed on all carriers.
    If next transmission is 1P on carrier i≠2 (carrier j≠2)
        (ambiguity C1): Move to either
            1T on carrier i and 1T on carrier j, i.e., assume 1P on carrier i and 1P on carrier j; no switching time may be needed.
            1T on carrier i (carrier j) and 1T on carrier k, i.e., assume 1P on carrier i (carrier j) and 1P on carrier k; switching time may be needed on all carriers.
    If next transmission is 1P on carrier k=2
        (ambiguity D): Move to either
            2T on carrier k, i.e., assume 2P on carrier k; switching time may be needed on all carriers.
            1T on carrier i and 1T on carrier k, i.e., assume 1P on carrier i and 1P on carrier k; switching time may be needed on carrier j and k.
            1T on carrier j and 1T on carrier k, i.e., assume 1P on carrier j and 1P on carrier k; switching time may be needed on carrier i and k.
    If next transmission is 1P on carrier k≠2
        (ambiguity D1): Move to either
            1T on carrier i and 1T on carrier k, i.e., assume 1P on carrier i and 1P on carrier k; switching time may be needed on carrier j and k.
            1T on carrier j and 1T on carrier k, i.e., assume 1P on carrier j and 1P on carrier k; switching time may be needed on carrier i and k.

If previous transmission is 1P on carrier i
    If next transmission is 2P on carrier i
        Move to 2T on carrier i
            If current Tx state is 2T on carrier i
                No switching time may be needed.
            If current Tx state is 1T on carrier i and 1T on carrier j (carrier k)
                Switching time may be needed on carrier j (k).
    If next transmission is 2P on carrier j
        Move to 2T on carrier j;
            If current Tx state is 1T on carrier i and 1T on carrier j
                Switching time may be needed on carrier i and j.
            If current Tx state is 1T on carrier i and 1T on carrier k
                Switching time may be needed on all carriers.
    If next transmission is 1P on carrier i and 1P on carrier j
        Move to 1T on carrier i and 1T on carrier j
            If current Tx state is 2T on carrier i
                Switching time may be needed on carriers i and j.
            If current Tx state is 1T on carrier i and 1T on carrier j
                No switching time may be needed.
            If current Tx state is 1T on carrier i and 1T on carrier k
                Switching time may be needed on carriers j and k.
    If next transmission is 1P on carrier j and 1P on carrier k
        Move to 1T on carrier j and 1T on carrier k
            If current Tx state is 2T on carrier i
                Switching time may be needed on all carriers.
            If current Tx state is 1T on carrier i and 1T on carrier j (carrier k)
                Switching time may be needed on carrier i and k (j).
    If next transmission is 1P on carrier i
        (ambiguity E): Move to either
            2T on carrier i, i.e., assume 2P on carrier i
                If current Tx state is 2T on carrier i
                No switching time may be needed.
                If current Tx state is 1T on carrier i and 1T on carrier j (k)
                Switching time may be needed on carrier i and j (k).

1T on carrier i and 1T on carrier j (carrier k), i.e., assume 1P on carrier i and 1T on carrier j (carrier k)
    If current Tx state is 2T on carrier i
    Switching time may be needed on carriers i and j (k).
    If current Tx state is 1T on carrier i and 1T on carrier j (k)
    No switching time may be needed.
    If current Tx state is 1T on carrier i and 1T on carrier k (j)
    Switching time may be needed on carriers j and k.
If next transmission is 1P on carrier j
    (ambiguity F): Move to either
        2T on carrier j, i.e., assume 2P on carrier j
        If current Tx state is 2T on carrier i
        Switching time may be needed on carriers i and j.
        If current Tx state is 1T on carrier i and 1T on carrier j
        Switching time may be needed on carriers i and j.
        If current Tx state is 1T on carrier i and 1T on carrier k
        Switching time may be needed on all carriers.
    1T on carrier i and 1T on carrier j, i.e., assume 1P on carrier i and 1T on carrier j;
        If current Tx state is 2T on carrier i
        Switching time may be needed on carriers i and j.
        If current Tx state is 1T on carrier i and 1T on carrier j
        No switching time may be needed.
        If current Tx state is 1T on carrier i and 1T on carrier k
        Switching time may be needed on carriers j and k.
    1T on carrier j and 1T on carrier k, i.e., assume 1P on carrier j and 1T on carrier k
        If current Tx state is 2T on carrier i
        Switching time may be needed on all carriers.
        If current Tx state is 1T on carrier i and 1T on carrier j (carrier k)
        Switching time may be needed on carriers i and k (j).

Resolving Ambiguities

In Rel-17, for the UE configured with uplinkTxSwitchingOption set to 'dualUL', if the UE is configured with OneT with uplinkTxSwitching-DualUL-TxState, when the UE is under the operation state in which 2-port transmission can be supported on one carrier on one band, followed by no transmission on any carrier on the same band and 1-port transmission on the other carrier on another band, the UE may consider this as if a 1-port transmission was transmitted on both uplinks. Otherwise the UE may consider this as if a 2-port transmission took place on the transmitting carrier.

In Rel-17 dual UL, ambiguity about the next Tx state occurs when the next transmission is 1p on a carrier and no other transmission on the other carrier, and the previous state was 2T on the other carrier, in which case both 1T+1T and 0T+2T may work. Moreover, ambiguity about next Tx state happens when the next transmission is 1p on a carrier and no other transmission on any other carrier, and the previous state does not support 1p on the carrier. This may be generalized as the case when there are more than two carriers configured. For example, assume N=4 carriers with the first two being NUL and SUL of the same band. When 1p is scheduled on a carrier i and no other transmission is scheduled on other carriers, the following Tx chain configurations can support this scheduling:

If i=1 or 2 (NUL or SUL of first carrier), and 2T on carrier i (one such configuration), 1T on carrier i and 1T on carrier j where j≠3—i (2 such configurations), then the total number of configurations to support this transmission is N−1=3 configurations.

If i≠1 and 2 (NUL of carriers other than first), and 2T on carrier i (one such configuration, 1T on carrier i and 1T on carrier j(3 such configurations), then the total number of configurations to support this transmission is N=4 configurations.

Therefore, for a situation where N carriers are configured, with the first and second carriers being NUL and SUL of the same band, the specification statement capturing ambiguity resolution may state that for [statement capturing the situation and possibly necessary UE capabilities], when the UE is under the operation state in which 1-port transmission cannot be supported on one carrier on one band followed by 1-port transmission on the one carrier on the same band and no transmission on the other carriers on the other N−1 bands, the UE shall consider this as if [N−1 possible configurations to pick from according to some rule/configuration/capability] if the one carrier is carrier 1 or carrier 2. Otherwise, consider this as if [N−1 possible configurations to pick from according to some rule/configuration/capability].

Levels of Switching Gaps

When switching Tx chains from one carrier to another, switching time may be needed to allow the UE to stop ongoing UL transmission on carriers affected by the Tx chain switching, and to synchronize Tx chains which are going to contribute to a 2p transmission on a carrier.

In some embodiments, when the UL Tx switching occurs from one carrier to another, the UE may need to change the operation of one or more Tx chains from the first carrier to the second carrier. This switching operation may rely on a duration $N_{switch}$, during which the UE cannot use the Tx chain to perform UL transmissions.

Figure 2:
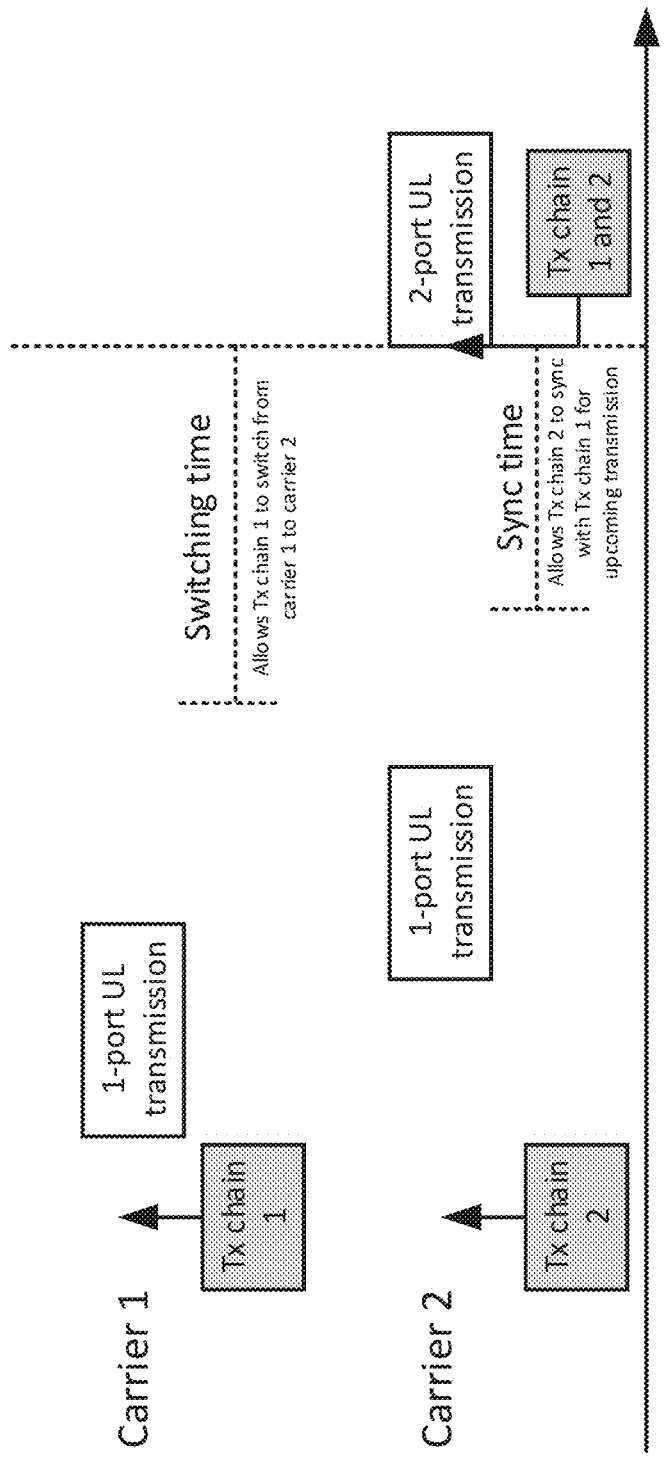
FIG. 2 is a diagram illustrating durations that are needed for switching and synchronization of Tx chains in case of UL Tx switching according to embodiments of the present disclosure.

In some embodiments, the UE may need to perform a 2-port transmission which requires that the two Tx chains are synchronized. In some situations, one Tx chain can be already configured on the new carrier transporting the upcoming 2-port transmission, while the other Tx chain can be switching from another carrier. Because of the switching operation for the other Tx chain, the preceding carrier cannot be used for a duration $N_{switch}$ However, because the first Tx chain is already configured to the new carrier, it may not be able to perform UL transmissions for a potentially smaller duration $N_{sync}$, which may be needed to synchronize the operation of the two Tx chains on the new carrier in preparation for the upcoming 2-port transmission. Accordingly, FIG. 2 shows the durations that are needed for switching and synchronization of Tx chains in case of UL Tx switching.

The UL switching operation behavior relies on how transmissions are scheduled in succession on the different carriers configured for UL operation.

Figure 3:
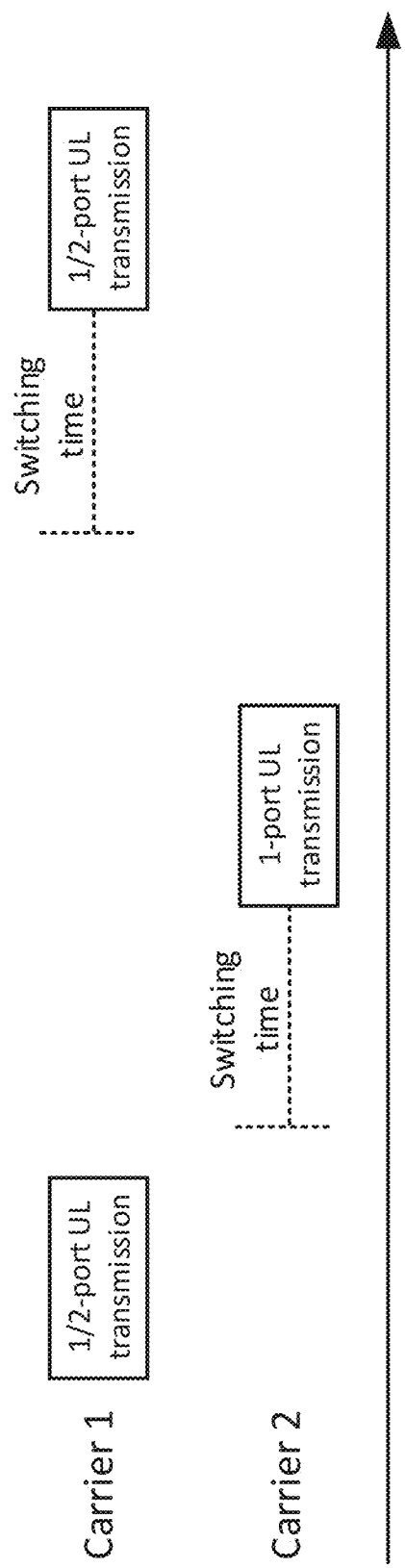
FIG. 3 is a diagram illustrating UL transmission on carrier 1 and carrier 2, according to embodiments of the present disclosure.

The operation in 3$^{rd}$ Generation Partnership Project (3GPP) Technical Specification (TS) 38.214, 6.1.6.2.1 describes a switching case when the UE transmits one transmission on one carrier (e.g., Carrier 1) and is then followed by no transmission on Carrier 1 and a 1-port transmission on another carrier (e.g., Carrier 2). To further clarify the definition of "no transmission," consider the situation depicted in FIG. 3. The operation described in the specification in 3GPP TS 38.214, 6.1.6.2.1 is indicated by the fact that no transmission on Carrier 1 follows the first transmission.

In some embodiments, the notion of "no transmission" may depend on how far or how close in time are the transmissions on Carrier 1 and Carrier 2. Without a clear definition of this notion, the UL switching behavior can be ambiguous and may lead to a misunderstanding between UE and gNB behaviors. The following clarifies the meaning of the phrase "no transmission on Carrier 1 and a transmission on Carrier 2." Without loss of generality, Carrier 1 is the carrier with previous transmission and Carrier 2 is the target carrier for the next UL transmission. Accordingly, the timing relation between actual UL transmissions on the two carriers is described.

In some embodiments, the phrase "no transmission on Carrier 1 and a transmission on Carrier 2" may be interpreted to mean that no transmission on Carrier 1 starts within the duration of the transmission on Carrier 2, i.e., there are no overlaps between the two transmissions. Thus, because simultaneous transmissions occur concurrently and overlap in time, this phrase negates that event. This condition can be equivalently stated as "later than the start of the transmission on Carrier 2 but before the end of transmissions on Carrier 2."

In some embodiments, the phrase "no transmission on Carrier 1 and a transmission on Carrier 2" may be interpreted to mean that no transmission on Carrier 1 starts at the same time as the transmission on Carrier 2. This may be a simpler interpretation than in the previous interpretation because it is only concerned with one starting time for both transmissions and therefore there may not be a need for additional timeline concerns.

In some embodiments, the phrase "no transmission on Carrier 1 and a transmission on Carrier 2" may be interpreted to mean that no transmission on Carrier 1 starts before the transmission on Carrier 2 and overlaps with the transmission on Carrier 2, where transmission on Carrier 1 is interrupted due to UL switching. This definition also discusses the notion of simultaneous transmissions as the previous interpretation, while including the case of having transmission on Carrier 1 starting before one in Carrier 2 and being continued after an interruption happens. Accordingly, some implementations may follow this interpretation.

In some embodiments, the phrase "no transmission on Carrier 1 and a transmission on Carrier 2" may be interpreted to mean that no transmission on Carrier 1 starts before the transmission on Carrier 2 and overlaps with the transmission on Carrier 2, where transmission on Carrier 1 is not interrupted due to UL switching. This definition includes the case where interruption does not occur, which may also be handled by some implementations.

Figure 4:
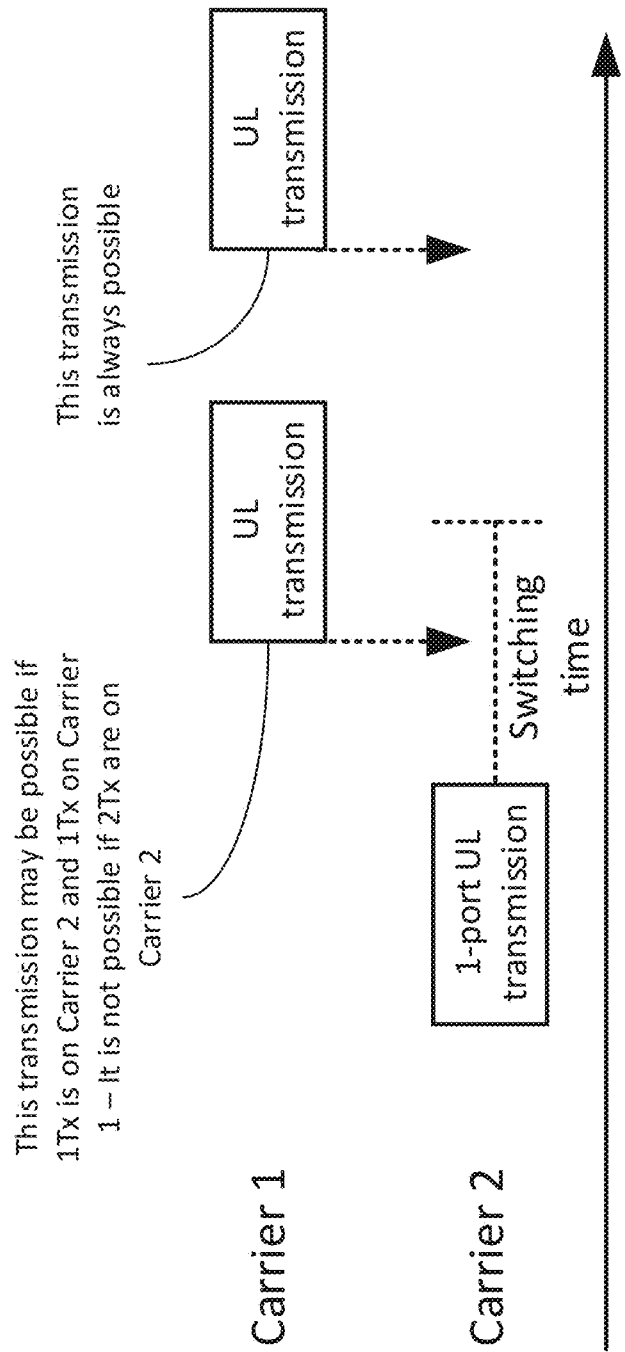
FIG. 4 is a diagram illustrating UL transmission on carrier 1 and carrier 2, according to embodiments of the present disclosure.

Thus, based on the above-described interpretations, an overlap between the transmissions on Carrier 1 and Carrier 2 means an overlap in the time durations of the transmissions. In some embodiments, the overlap may also include the time duration of the transmission, as well as a gap for UL switching interruption which extends after the earlier of the two transmissions. Considering the first interpretation described above, this extension would result in the interpretation that no transmission on Carrier 1 starts within a time duration which starts at the starting time of the transmission on Carrier 2, and ends after time N of the ending time of the transmission on Carrier 2. Thus, time N can be equal to $N_{Tx1\text{-}Tx2}$ (i.e., the switching time for the case of going from 1Tx to 2Tx) or $N_{Tx2\text{-}Tx2}$ (i.e., the switching time for the case of going from 2Tx to 2Tx) or other values. In some embodiments, $N_{Tx1\text{-}Tx2}=N_{Tx2\text{-}Tx2}$ because establishing the condition "no transmission on Carrier 1 and a transmission on Carrier 2" may help to determine whether 1Tx chain or 2Tx chains can be configured on Carrier 2 during the UL transmission. It is assumed that the UL transmission on Carrier 2 is a 1-port UL transmission, which is allowed given the existence of either 1Tx or 2Tx on the carrier. Configuring 1Tx chain on Carrier 2 and 1Tx on Carrier 1 may allow for the UL transmission on Carrier 1, while UL transmission on Carrier 2 is on-going. However, having 2Tx on Carrier 2 may require that no UL transmission occurs on Carrier 1. This restriction is applicable for any UL transmission, which happens during the UL transmission on Carrier B, and during a time duration equal to $N_{Tx1\text{-}Tx2}$ after the ending of the UL transmission on Carrier B because there is not sufficient time to allow for Tx switching from Carrier B to Carrier A. This situation is illustrated in FIG. 4.

In some embodiments, the phrase "no transmission on Carrier 1" may be interpreted as "no 1P transmission on Carrier 1" because if the transmission on Carrier 1 is 2P, then it would anyways require switching to 2T on Carrier 1, and therefore it would not matter which configuration a UE assumes during the transmission on Carrier 2.

In some embodiments, no transmission occurs on Carrier 1, which starts exactly at the same time as the transmission on Carrier 2. In other embodiments, no transmission occurs on Carrier 1 after the first transmission on Carrier 1; or no transmission occurs on Carrier 1 after the first transmission on Carrier 1, and before a certain duration X measured from the ending of the first transmission on Carrier 1.

Timeline Requirements for Dynamically Indicated UL Transmission on Carrier 1

Implications of the phrase "no transmission on Carrier 1" on the timeline requirements for receiving downlink control information (DCI) for scheduling the UL transmissions involved in the switching operation is described. In some embodiments, the phrase "no transmission on Carrier 1" may be interpreted as no transmission on Carrier 1 occurs for which the scheduling DCI is received prior to $T_0-T_{offset}$ where $T_0$ is the starting time of the UL transmission on Carrier 2. In another rembodiment, it may be interpreted as no transmission on Carrier 1 occurs for which the DCI scheduling the transmission on Carrier 1 is received before the DCI scheduling the transmission on Carrier 2. It is noted that defining concurrent (e.g., simultaneous) transmissions on Carrier 1 and Carrier 2, or alternatively a phrase such as "a transmission on Carrier 1 and a transmission on Carrier 2," may be considered as the opposite of the phrase "no transmission on Carrier 1." Therefore, all aspects discussed above can be readily extended to this phrase as well when defining simultaneous transmission on Carrier 1 and Carrier 2. It is further noted that interpreting the phrase "no transmission on Carrier 1 and a transmission on Carrier 2" means not having a transmission on Carrier 1 with any one, all, or any combination of the characteristics described above.

In accordance with the above-described embodiments, the following text may be proposed in a specification such as e 3GPP TS 38.214, 6.1.6.2.1, 2Tx Uplink Switching for Carrier Aggregation.

6.1.6.2.1 2Tx Uplink Switching for Carrier Aggregation

For a UE indicating a capability for uplink switching with BandCombination-UplinkTxSwitch2TX for a band combination, and if it is for that band combination configured with uplink carrier aggregation:

If the UE is configured with uplink switching with parameter uplinkTxSwitching, when the UE is to transmit in the uplink based on DCI(s) received before $T_0-T_{offset}$ or based on a higher layer configuration(s):

When the UE is to transmit a 2-port transmission on one uplink carrier on one band and if the preceding uplink transmission included a 1-port or 2-port transmission on another uplink carrier on another band, then the UE is not expected to transmit for the duration of $N_{Tx1-Tx2}$ on any of the uplink carriers.

When the UE is to transmit a 1-port or 2-port transmission on one uplink carrier on one band if the preceding uplink transmission is a 2-port transmission on another uplink carrier on one band, then the UE is not expected to transmit for the duration of $N_{Tx1-Tx2}$ on any of the uplink carriers.

For the UE configured with uplinkTxSwitchingOption set to 'switchedUL', when the UE is to transmit a 1-port transmission on one uplink carrier on one band and if the preceding uplink transmission was a 1-port transmission on another uplink carrier on one band, then the UE is not expected to transmit for the duration of $N_{Tx1-Tx2}$ on any of the two carriers.

For the UE configured with uplinkTxSwitchingOption set to 'dualUL', when the UE transmitted 1-port or 2-port transmission on one carrier on one band followed by no transmission on this carrier and 1-port transmission on the other carrier on another band, if the UE was configured with [yyy] for subsequent switching consideration the UE shall consider this as if 1-port transmission was transmitted on both uplinks, otherwise the UE shall consider this as if 2-port transmission took place on the transmitting carrier, where "no transmission on this carrier and x-port transmission on the other carrier" means that the time duration of the transmission on this carrier does not overlap partially or fully with the duration of the transmission on the other carrier and the duration of length $N_{Tx1-Tx2}$ after the end of the transmission on the other carrier.

The UE is not expected to be scheduled or configured with uplink transmissions that results in simultaneous transmission on two antenna ports on one uplink carrier, and any transmission on another uplink carrier.

When the UE is to transmit a 2-port transmission on one uplink carrier and if the preceding uplink transmission was a 1-port on the same uplink carrier and the UE is under the operation state in which 2-port transmission cannot be supported in either uplink carrier, then the UE is not expected to transmit for the duration of $N_{Tx1-Tx2}$ on either of the two carriers.

In all other cases the UE is expected to transmit normally all uplink transmissions without interruptions.

Figure 5:
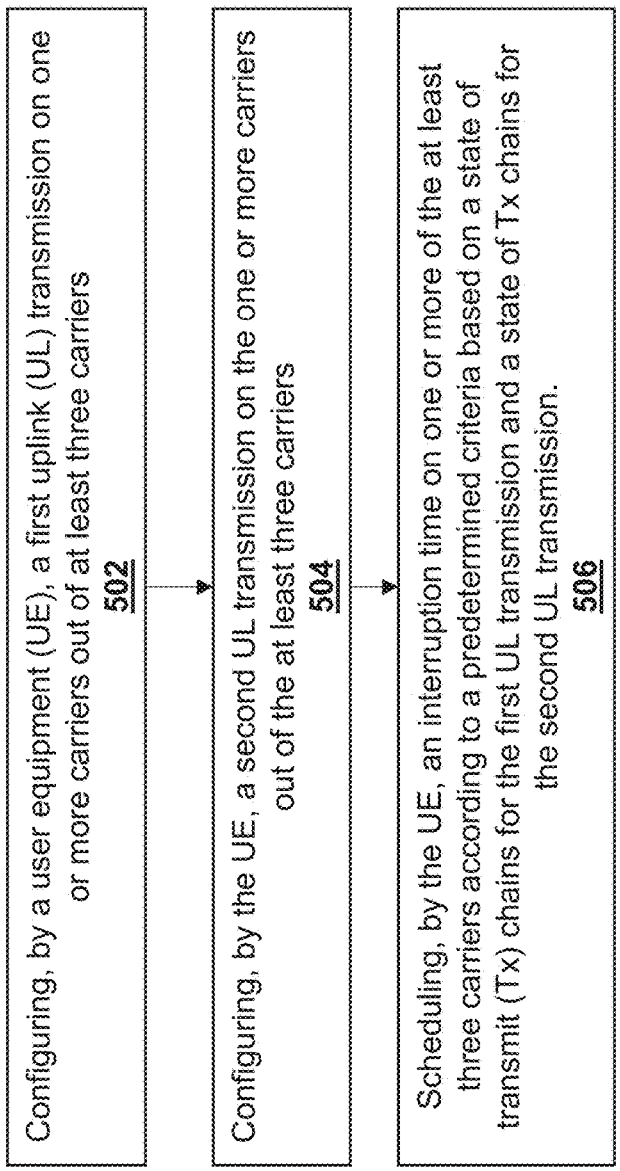
FIG. 5 is a flow chart 500 of a method for determining interruption times for dynamic uplink transmitter switching, according to embodiments of the present disclosure.

FIG. 5 is a flow chart 500 of a method for determining interruption times for dynamic uplink transmitter switching, according to various embodiments of the present disclosure.

Accordingly, in some embodiments, the UE may configure a first uplink transmission on one or more carriers out of at least three carriers (502). In other words, there may be three or more carriers (or bands) and the first uplink transmission may be configured to transmit on one or more out of the three or more carriers of the UE. Thus, for example, if there are three carriers (although there may be more than three carriers in some embodiments) the first uplink transmission may be configured to transmit on just the first carrier, just the second carrier, just the third carrier, or the first and second carriers, the second and third carriers, or the first and third carriers. A person having ordinary skill in the art will understand that other combinations are possible, particularly in cases where there are more carriers, such as four carriers.

It should be noted that herein the present disclosure, the term "carrier" may also be referred to by the terms "band" or "frequency band," and that such terms may be used or interpreted interchangeably.

In some embodiments, a second uplink transmission may be configured to transmit also on the one or more carriers out of the three or more carriers of the UE. As stated above, there are at least three carriers but is not limited thereto and there may be more than three carriers (504). However, in an example where there are three carriers, the second uplink transmission may be configured to transmit on just the first carrier, just the second carrier, just the third carrier, or the first and second carrier, the second and third carriers, or the first and third carriers, in a manner similar to the configuration of the first uplink transmission.

In some embodiments, the UE may schedule an interruption time on one or more of the at least three carriers according to a predetermined criteria based on a state of transmit (Tx) chains for the first uplink transmission and a state of Tx chains for the second uplink transmission (506). Thus, an interruption time may be scheduled on one or more of the carriers when certain criteria are met based on the Tx chains. For example, the state of the Tx chains for the first uplink transmission may include one Tx chain associated with a first carrier and one Tx chain associated with a second carrier, and the second uplink transmission may include a 1 port transmission or a 2 port transmission on the third carrier. In this case, an interruption time may be scheduled so that there may be sufficient time to switch carriers between the first and second uplink transmissions.

According to another example, the state of the Tx chains for the first uplink transmission may include two Tx chains associated with the first carrier, and the second uplink transmission may include a 1 port transmission one the second carrier and a 1 port transmission on the third carrier. In this case, an interruption time may be scheduled so that there may be sufficient time to switch carriers between the first and second uplink transmissions.

According to another example, the state of the Tx chains for the first uplink transmission may include one Tx chain associated with a first carrier and one Tx chain associated with a second carrier, and the second uplink transmission includes a 1 port transmission on the first carrier and a 1 port transmission on the third carrier. In this case, an interruption time may be scheduled so that there may be sufficient time to switch carriers between the first and second uplink transmissions.

In some embodiments, the state of the Tx chains for the first uplink transmission may include two Tx chains associated with a first carrier, and the second uplink transmission may include a 1 port transmission on the second carrier and no transmission on the first and the third carriers. In such case, the switching of the two Tx chain or one Tx chains to the second carrier may be based on a radio resource control (RRC) indication.

In some embodiments, no transmission occurring on the first and third carriers may mean that other transmissions do not occur at the same time or do not overlap with the first and third carriers. For example, in some embodiments, the UE may configure a third uplink transmission on one or more of the at least three carriers of the UE, and such transmission does not overlap partially or fully with any portion or any duration of the second uplink transmission on the second carrier. Yet in some embodiments, the third uplink transmission on the carriers may start after a certain duration of length after the end of the second uplink transmission on a carrier and/or before a certain duration of length before the second uplink transmission on a carrier. For example, the third uplink transmission on the first carrier or the third carrier may start after a duration of length $N_{Tx1\text{-}Tx2}$ from an end of the second uplink transmission on the second carrier and/or may end before a duration of length $N_{Tx1\text{-}Tx2}$ from a start of the second uplink transmission on the second carrier, wherein N corresponds to the number of carriers. Accordingly, there is no overlap because there is a separation by a duration of a certain length between the transmissions. Yet according to another embodiment, the third uplink transmission on the first or third carrier starts later than a starting time of the second uplink transmission on the second carrier.

In some embodiments, the state of the Tx chains for the first uplink transmission may include one Tx chain associated with a first carrier and one Tx chain associated with a second carrier, and the second uplink transmission may include a 1 port transmission on the third carrier. In such case, the two Tx chains or one Tx chain may be switched to the third carrier in the second uplink transmission and not transmitting on the first carrier and the second carrier based on RRC indication. In some embodiments, one Tx chain may be switched to the third carrier in the second uplink transmission and another Tx chain may be switched to any one or more of the remaining carriers. For example, if there are more than three carriers, such as four carriers, then the Tx chain may be switched to the fourth carrier. Accordingly, a person skill in the art would understand that other configurations are possible based on the number of carriers.

Figure 6:
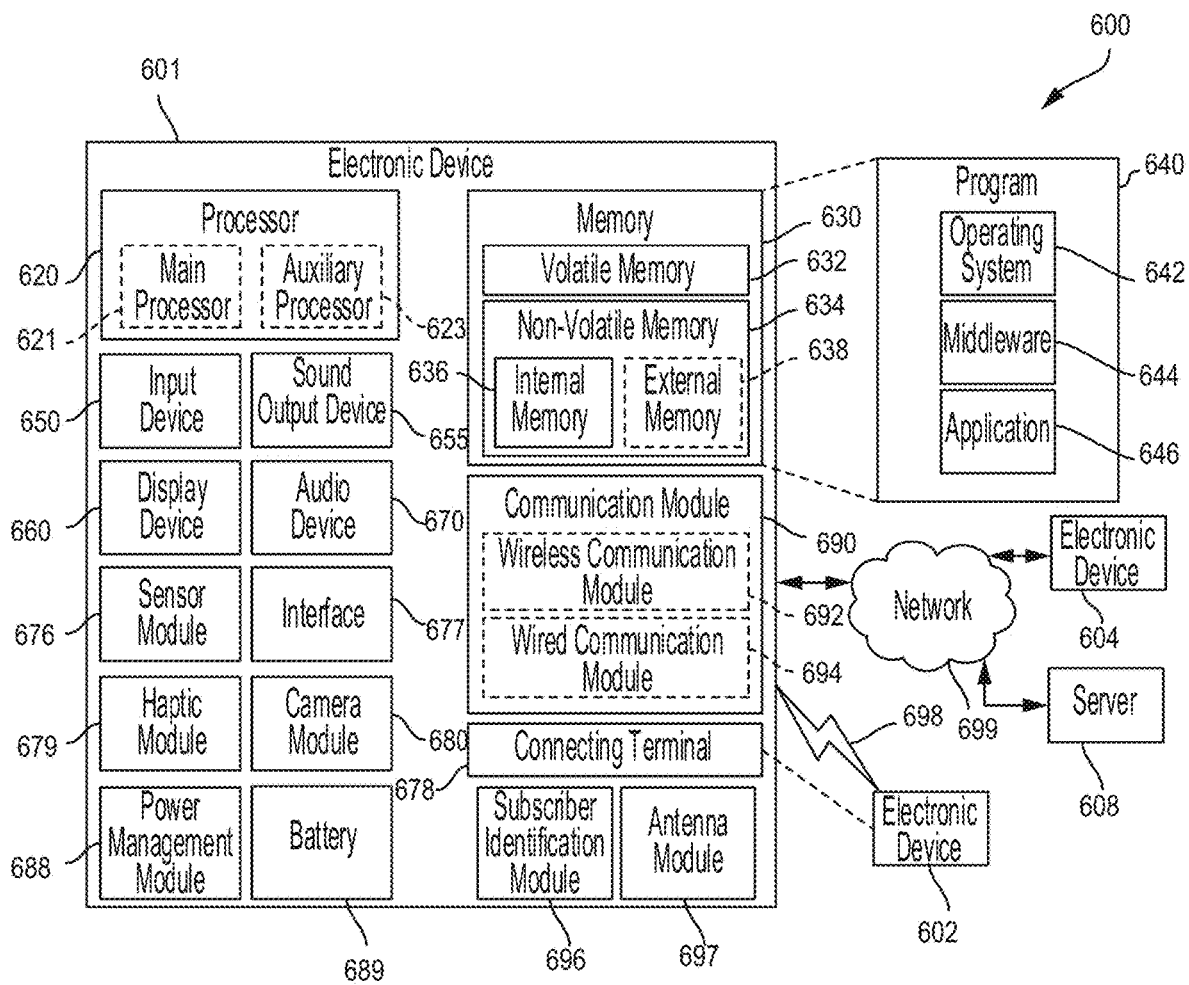
FIG. 6 is a block diagram of an electronic device in a network environment, according to an embodiment.

FIG. 6 is a block diagram of an electronic device in a network environment 600, according to an embodiment.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 640, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 694. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute software (e.g., a program 640) to control at least one other component (e.g., a hardware or a software component) of the electronic device 601 coupled with the processor 620 and may perform various data processing or computations.

As at least part of the data processing or computations, the processor 620 may load a command or data received from another component (e.g., the sensor module 646 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high-definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. The haptic module 679 may include, for example, a motor, a piezoelectric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

Figure 7:
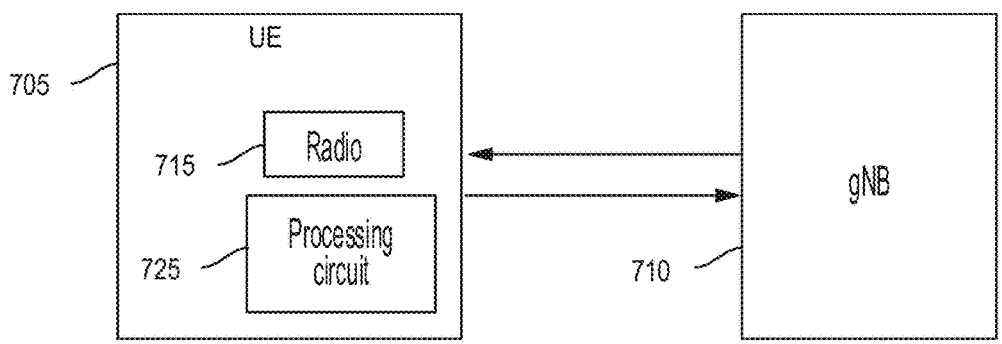
FIG. 7 shows a system including a UE 705 and a gNB 710, in communication with each other.

FIG. 7 shows a system including a UE 705 and a gNB 710, in communication with each other. The UE may include a radio 715 and a processing circuit (or a means for processing) 720, which may perform various methods disclosed herein, e.g., the method illustrated in FIG. 1. For example, the processing circuit 620 may receive, via the radio 715, transmissions from the network node (gNB) 710, and the processing circuit 720 may transmit, via the radio 715, signals to the gNB 710.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:
    configuring, by a user equipment (UE), a first uplink (UL) transmission on one or more carriers out of at least three carriers;
    configuring, by the UE, a second UL transmission on one or more carriers out of the at least three carriers; and
    scheduling, by the UE, an interruption time on one or more carriers of the at least three carriers according to a predetermined criteria based on a state of transmit (Tx) chains for the first UL transmission and a state of Tx chains for the second UL transmission, wherein the predetermined criteria include one or more of:
    the UE scheduling upcoming transmissions with a maximum number of ports;
    the UE minimizing a number of interruption times across the at least three carriers; and
    the UE assigning a set carrier among the at least three carriers for at least one of the Tx chains for the first UL transmission or the Tx chains for the second UL transmission.

2. The method of claim 1, wherein the state of the Tx chains for the first UL transmission comprises one Tx chain associated with a first carrier and one Tx chain associated with a second carrier,
    the method further comprising scheduling the interruption time responsive to determining that the second UL transmission comprises a 1 port transmission or a 2 port transmission on a third carrier.

3. The method of claim 1, wherein the state of the Tx chains for the first UL transmission comprises two Tx chains associated with a first carrier,
    the method further comprising scheduling the interruption time responsive to determining that the second UL transmission comprises a 1 port transmission on a second carrier and a 1 port transmission on a third carrier.

4. The method of claim 1, wherein the state of the Tx chains for the first UL transmission comprises one Tx chain associated with a first carrier and one Tx chain associated with a second carrier,
    the method further comprising scheduling the interruption time responsive to determining that the second UL transmission comprises a 1 port transmission on the first carrier and a 1 port transmission on a third carrier.

5. The method of claim 1, wherein the state of the Tx chains for the first UL transmission comprises two Tx chains associated with a first carrier, and the second UL transmission comprises a 1 port transmission on a second carrier,
    the method further comprising switching two Tx chains or one Tx chain to the second carrier in the second UL transmission and not transmitting on the first carrier and a third carrier, based on radio resource control (RRC) indication.

6. The method of claim 5, further comprising configuring, by the UE, a third UL transmission on the one or more carriers out of the at least three carriers,
    wherein the third UL transmission on the first carrier or the third carrier does not overlap with a duration of the second UL transmission on the second carrier.

7. The method of claim 6, wherein the third UL transmission on the first carrier or the third carrier starts after a duration of length $N_{Tx1-Tx2}$ from an end of the second UL transmission on the second carrier and/or ends before a duration of length $N_{Tx1-Tx2}$ from a start of the second UL transmission on the second carrier.

8. The method of claim 5, further comprising configuring, by the UE, a third UL transmission on the one or more carriers out of the at least three carriers,
    wherein the third UL transmission on the first carrier or the third carrier starts later than a starting time of the second UL transmission on the second carrier.

9. The method of claim 1, wherein the state of the Tx chains for the first UL transmission comprises one Tx chain associated with a first carrier and one Tx chain associated with a second carrier, and the second UL transmission comprises a 1 port transmission on a third carrier, the method further comprising switching two Tx chains or one Tx chain to the third carrier in the second UL transmission and not transmitting on the first carrier and the second carrier, based on RRC indication.

10. The method of claim 9, the method further comprising switching one Tx chain to the third carrier in the second UL transmission, and switching another Tx chain to any one or more of remaining carriers, based on RRC indication.

11. The method of claim 1, wherein a first carrier, a second carrier, and a third carrier of the at least three carriers are each configured to support two ports.

12. The method of claim 1, wherein a first carrier of the at least three carriers is configured to support one port, and second and third carriers of the at least three carriers are configured to support two ports.

13. The method of claim 1, wherein first and second carriers of the at least three carriers are configured to support one port, and a third carrier of the at least three carriers is configured to support two ports.

14. A system comprising:
a user equipment (UE) comprising:
a memory; and
a processor configured to execute instructions stored in the memory to perform operations comprising:
configuring a first uplink (UL) transmission on one or more carriers out of at least three carriers;
configuring a second UL transmission on one or more carriers out of the at least three carriers; and
scheduling an interruption time on one or more of the at least three carriers according to a predetermined criteria based on a state of transmit (Tx) chains for the first UL transmission and a state of Tx chains for the second UL transmission, wherein the predetermined criteria include one or more of:
the UE scheduling upcoming transmissions with a maximum number of ports;
the UE minimizing a number of interruption times across the at least three carriers; and
the UE assigning a set carrier among the at least three carriers for at least one of the Tx chains for the first UL transmission or the Tx chains for the second UL transmission.

15. The system of claim 14, wherein the state of the Tx chains for the first UL transmission comprises one Tx chain associated with a first carrier and one Tx chain associated with a second carrier,
the operation further comprising scheduling the interruption time responsive to determining that the second UL transmission comprises a 1 port transmission or a 2 port transmission on a third carrier.

16. The system of claim 14, wherein the state of the Tx chains for the first UL transmission comprises two Tx chains associated with a first carrier,
the operations further comprising scheduling the interruption time responsive to determining that the second UL transmission comprises a 1 port transmission on a second carrier and a 1 port transmission on a third carrier.

17. The system of claim 14, wherein the state of the Tx chains for the first UL transmission comprises one Tx chain associated with a first carrier and one Tx chains associated with a second carrier,
the operations further comprising scheduling the interruption time responsive to determining that the second UL transmission comprises a 1 port transmission on the first carrier and a 1 port transmission on a third carrier.

18. The system of claim 14, wherein the state of the Tx chains for the first UL transmission comprises two Tx chains associated with a first carrier, and the second UL transmission comprises a 1 port transmission on a second carrier,
the operations further comprising switching two Tx chains or one Tx chain to the second carrier in the second UL transmission and not transmitting on the first carrier and a third carrier, based on radio resource control (RRC) indication.

19. The system of claim 18, wherein the operations further comprise configuring, by the UE, a third UL transmission on the one or more carriers out of the at least three carriers,
wherein the third UL transmission on the first carrier or the third carrier does not overlap with a duration of the second UL transmission on the second carrier.

20. The system of claim 19, wherein the third UL transmission on the first carrier or the third carrier starts after a duration of length $N_{Tx1\text{-}Tx2}$ from an end of the second UL transmission on the second carrier and/or ends before a duration of length $N_{Tx1\text{-}Tx2}$ from a start of the second UL transmission on the second carrier.

21. The system of claim 18, wherein the operations further comprise configuring, by the UE, a third UL transmission on the one or more carriers out of the at least three carriers,
wherein the third UL transmission on the first carrier or the third carrier starts later than a starting time of the second UL transmission on the second carrier.

22. The system of claim 15, wherein the state of the Tx chains for the first UL transmission comprises one Tx chain associated with the first carrier and one Tx chain associated with the second carrier, and the second UL transmission comprises a 1 port transmission on the third carrier,
the operations further comprising switching two Tx chains or one Tx chain to the third carrier in the second UL transmission and not transmitting on the first carrier and the second carrier, based on RRC indication.

23. The system of claim 22, wherein the operations further comprising switching one Tx chain to the third carrier in the second UL transmission, and switching another Tx chain to any one or more of remaining carriers, based on RRC indication.

24. The system of claim 14, wherein a first carrier, a second carrier, and a third carrier of the at least three carriers are each configured to support two ports.

25. The system of claim 14, wherein a first carrier of the at least three carriers is configured to support one port, and second and third carriers of the at least three carriers are configured to support two ports.

26. The system of claim 14, wherein first and second carriers of the at least three carriers are configured to support one port, and a third carrier of the at least three carriers is configured to support two ports.

* * * * *